(12) United States Patent
Kim et al.

(10) Patent No.: US 12,438,597 B2
(45) Date of Patent: Oct. 7, 2025

(54) COMMUNICATION METHOD AND DEVICE IN WIRELESS COMMUNICATION SYSTEM SUPPORTING UNMANNED AERIAL SYSTEM SERVICE

(71) Applicant: Samsung Electronics Co., Ltd., Suwon-si (KR)

(72) Inventors: Dongyeon Kim, Suwon-si (KR); Sangjun Moon, Suwon-si (KR); Jungshin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 17/960,412

(22) Filed: Oct. 5, 2022

(65) Prior Publication Data
US 2023/0115431 A1    Apr. 13, 2023

(30) Foreign Application Priority Data

Oct. 8, 2021 (KR) .................. 10-2021-0134433
Nov. 4, 2021 (KR) .................. 10-2021-0150955

(51) Int. Cl.
*H04B 7/185* (2006.01)
*H04W 12/06* (2021.01)

(52) U.S. Cl.
CPC ........ *H04B 7/18504* (2013.01); *H04W 12/06* (2013.01)

(58) Field of Classification Search
CPC ..................... H04B 7/18504; H04W 12/06
See application file for complete search history.

(56) References Cited

U.S. PATENT DOCUMENTS

2018/0102831 A1    4/2018  Murphy
2024/0098494 A1*   3/2024  Baskaran ............... H04W 4/44
(Continued)

FOREIGN PATENT DOCUMENTS

WO    2021/163463 A1    8/2021

OTHER PUBLICATIONS

Oppo, Qualcomm, InterDigital, TS 23.256: AMF Mobility Event Exposure Support for UAS, 2021, pp. 5-7 (Year: 2021).*

(Continued)

*Primary Examiner* — Brandon J Miller
(74) *Attorney, Agent, or Firm* — Jefferson IP Law, LLP

(57) ABSTRACT

The disclosure relates to a $5^{th}$ generation (5G) or $6^{th}$ generation (6G) communication system for supporting a higher data transmission rate. A method performed by an unmanned aerial system network function (UAS NF) in a wireless communication system providing a UAS service for an unmanned aerial vehicle user equipment (UAV UE) is provided. The method includes receiving, from a UAS service supplier (USS), a first message including information on a UAV USS authentication and authorization (UUAA) revocation for the UAV UE, identifying UUAA information for the UAV UE, determining, based on the UUAA information, a network entity to which the information on the UUAA revocation for the UAV UE is to be notified, and transmitting, to the network entity, a second message including the information associated with the UUAA revocation for the UAV UE.

20 Claims, 17 Drawing Sheets

(56) References Cited

U.S. PATENT DOCUMENTS

2024/0098608 A1\* 3/2024 Wang .................... H04W 12/06
2024/0187861 A1\* 6/2024 Ferdi .................... H04W 60/06
2024/0236638 A1\* 7/2024 So ........................ H04W 12/06

OTHER PUBLICATIONS

S2-2104407, TS 23.256: Service Availability Event exposure to USS, May 10, 2021.
S2-2104923, TS 23.256: AMF Mobility Event Exposure support for UAS, May 29, 2021.
S3-213371, Revocation of UUAA in 5GS, Sep. 20, 2021.
Qualcomm Incorporated, S3-213520, Proposed text for UUAA revocations, Sep. 20, 2021.
International Search Report dated Jan. 13, 2023, issued in International Patent Application No. PCT/KR2022/014921.
Extended European Search Report dated Nov. 14, 2024, issued in European Application No. 22878857.6-1206.
3G pp TS 23. 256 V1 .1.0; 3rd Generation Partnership Project; Technical Specification Group Services and System Aspects; Support of Uncrewed Aerial Systems (UAS) connectivity, identification and tracking; Stage 2 (Release 17); XP052053398, Sep. 8, 2021.
Oppo et al: TS 23.256: AMF Mobility Event Exposure support for UAS; S2-2103922; XP052004266, May 10, 2021.
Huawei et al.: Clarification on terms related to UAV communication; S2-2104436; XP052004744, May 10, 2021.
Oppo: Proposal for generic handling of UAS status coordination between AMF & UASNF; S2-2103918; XP052004262, May 10, 2021.
Secretary of S2: Draft Auto-Generated Report of S2 meeting #52-146E; XP052059997, Sep. 22, 2021.

\* cited by examiner

COMMUNICATION METHOD AND DEVICE IN WIRELESS COMMUNICATION SYSTEM SUPPORTING UNMANNED AERIAL SYSTEM SERVICE

CROSS-REFERENCE TO RELATED APPLICATION(S)

This application is based on and claims priority under 35 U.S.C. § 119(a) of a Korean patent application number 10-2021-0134433, filed on Oct. 8, 2021, in the Korean Intellectual Property Office, and of a Korean patent application number 10-2021-0150955, filed on Nov. 4, 2021, in the Korean Intellectual Property Office, the disclosure of each of which is incorporated by reference herein in its entirety.

BACKGROUND

1. Field

The disclosure relates to a device and method for providing an unmanned aerial system service in a wireless communication system.

2. Description of Related Art

Fifth-generation (5G) mobile communication technology defines a wide frequency band to enable fast transmission speed and new services and may be implemented in frequencies below 6 GHz ('sub 6 GHz'), such as 3.5 GHz, as well as in ultra-high frequency bands ('above 6 GHz'), such as 28 GHz and 39 GHz called millimeter wave (mmWave). Further, sixth generation (6G) mobile communication technology, which is called a beyond 5G system, is considered to be implemented in terahertz bands (e.g., 95 GHz to 3 THz) to achieve a transmission speed 50 times faster than 5G mobile communication technology and ultra-low latency reduced by ¹/₁₀.

In the early stage of 5G mobile communication technology, standardization was conducted on beamforming and massive multiple input and multiple output (MIMO) for mitigating propagation pathloss and increasing propagation distance in ultrahigh frequency bands, support for various numerologies for efficient use of ultrahigh frequency resources (e.g., operation of multiple subcarrier gaps), dynamic operation of slot format, initial access technology for supporting multi-beam transmission and broadband, definition and operation of bandwidth part (BWP), new channel coding, such as low density parity check (LDPC) code for massive data transmission and polar code for high-reliable transmission of control information, L2 preprocessing, and network slicing for providing a dedicated network specified for a specific service, so as to meet performance requirements and support services for enhanced mobile broadband (eMBB), ultra-reliable low-latency communications (URLLC), and massive machine-type communications (mMTC).

Currently, improvement and performance enhancement in the initial 5G mobile communication technology is being discussed considering the services that 5G mobile communication technology has intended to support, and physical layer standardization is underway for technology, such as vehicle-to-everything (V2X) for increasing user convenience and assisting autonomous vehicles in driving decisions based on the position and state information transmitted from the voice over new radio (VoNR), new radio unlicensed (NR-U) aiming at the system operation matching various regulatory requirements, new radio user equipment (NR UE) power saving, non-terrestrial network (NTN) which is direct communication between UE and satellite to secure coverage in areas where communications with a terrestrial network is impossible, and positioning technology.

In addition, being standardized are radio interface architecture/protocols for technology of industrial Internet of things (IIoT) for supporting new services through association and fusion with other industries, integrated access and backhaul (IAB) for providing nodes for extending the network service area by supporting an access link with the radio backhaul link, mobility enhancement including conditional handover and dual active protocol stack (DAPS) handover, 2-operation RACH for NR to simplify the random access process, as well as system architecture/service fields for 5G baseline architecture (e.g., service based architecture or service based interface) for combining network functions virtualization (NFV) and software-defined networking (SDN) technology and mobile edge computing (MEC) for receiving services based on the position of the UE.

As 5G mobile communication systems are commercialized, soaring connected devices would be connected to communication networks so that reinforcement of the function and performance of the 5G mobile communication system and integrated operation of connected devices are expected to be needed. To that end, new research is to be conducted on, e.g., extended reality (XR) for efficiently supporting, e.g., augmented reality (AR), virtual reality (VR), and mixed reality (MR), and 5G performance enhancement and complexity reduction using artificial intelligence (AI) and machine learning (ML), support for AI services, support for metabus services, and drone communications.

Further, development of such 5G mobile communication systems may be a basis for multi-antenna transmission technology, such as new waveform for ensuring coverage in 6G mobile communication terahertz bands, full dimensional MIMO (FD-MIMO), array antenna, and large scale antenna, full duplex technology for enhancing the system network and frequency efficiency of 6G mobile communication technology as well as reconfigurable intelligent surface (RIS), high-dimensional space multiplexing using orbital angular momentum (OAM), metamaterial-based lens and antennas to enhance the coverage of terahertz band signals, AI-based communication technology for realizing system optimization by embedding end-to-end AI supporting function and using satellite and artificial intelligence (AI) from the operation of design, and next-generation distributed computing technology for implementing services with complexity beyond the limit of the UE operation capability by way of ultrahigh performance communication and computing resources.

Further, as described above, with the development of wireless communication systems, wireless communication systems may provide various services. In relation to the unmanned aerial vehicle (UAV) services proposed in the 3GPP standards among such various services, a need exists for a method for signaling authentication-related control information that is created due to the mobility of the unmanned aerial vehicle.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for stably managing an unmanned aerial system service in a wireless communication system.

Another aspect of the disclosure is to provide a method and device for managing subscription information related to authentication in a wireless communication system supporting an unmanned aerial system service.

Another aspect of the disclosure is to provide a method and device for notifying of a change in aerial subscription information when the change occurs in a wireless communication system supporting an unmanned aerial system service.

Additional aspects will be set forth in part in the description which follows and, in part, will be apparent from the description, or may be learned by practice of the presented embodiments.

In accordance with an aspect of the disclosure, a method performed by an unmanned aerial system network function (UAS NF) in a wireless communication system providing a UAS service for an unmanned aerial vehicle user equipment (UAV UE) is provided. The method includes receiving, from a UAS service supplier (USS), a first message including information on a UAV USS authentication and authorization (UUAA) revocation for the UAV UE, identifying UUAA information for the UAV UE, determining, based on the UUAA information, a network entity to which the information on the UUAA revocation for the UAV UE is to be notified, and transmitting, to the network entity, a second message including the information associated with the UUAA revocation for the UAV UE.

In accordance with another aspect of the disclosure, an unmanned aerial system network function (UAS NF) in a wireless communication system providing a UAS service for an unmanned aerial vehicle user equipment (UAV UE) is provided. The UAS NF includes a transceiver, and at least one processor configured to receive, via the transceiver from a UAS service supplier (USS), a first message including information on a UAV USS authentication and authorization (UUAA) revocation for the UAV UE, identify UUAA information for the UAV UE, determine, based on the UUAA information, a network entity to which the information on the UUAA revocation for the UAV UE is to be notified, and transmit, to the network entity via the transceiver, a second message including the information associated with the UUAA revocation for the UAV UE.

In accordance with another aspect of the disclosure, an access and mobility management function (AMF) in a wireless communication system providing an unmanned aerial system (UAS) service for an unmanned aerial vehicle user equipment (UAV UE) is provided. The AMF includes a transceiver, and at least one processor configured to perform a UAV UAS service supplier (UAV USS) authentication and authorization-mobility management (UUAA-MM) procedure for the UAV UE, receive, via the transceiver from an unified data management (UDM) managing aerial subscription information, a first message for indicating a change of the aerial subscription information for the UAV UE, and transmit, to a UAS network function (UAS NF) via the transceiver, a second message for indicating the change of the aerial subscription information for the UAV UE.

In accordance with another aspect of the disclosure, a session management function (SMF) in a wireless communication system providing an unmanned aerial system (UAS) service for an unmanned aerial vehicle user equipment (UAV UE) is provided. The SMF includes a transceiver, and at least one processor configured to perform a UAV UAS service supplier (UAV USS) authentication and authorization-session management (SM) procedure for the UAV UE, receive, via the transceiver from an unified data management (UDM) managing aerial subscription information, a first message for indicating a change of the aerial subscription information for the UAV UE, and transmit, to a UAS network function (UAS NF) via the transceiver, a second message for indicating the change of the aerial subscription information for the UAV UE.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
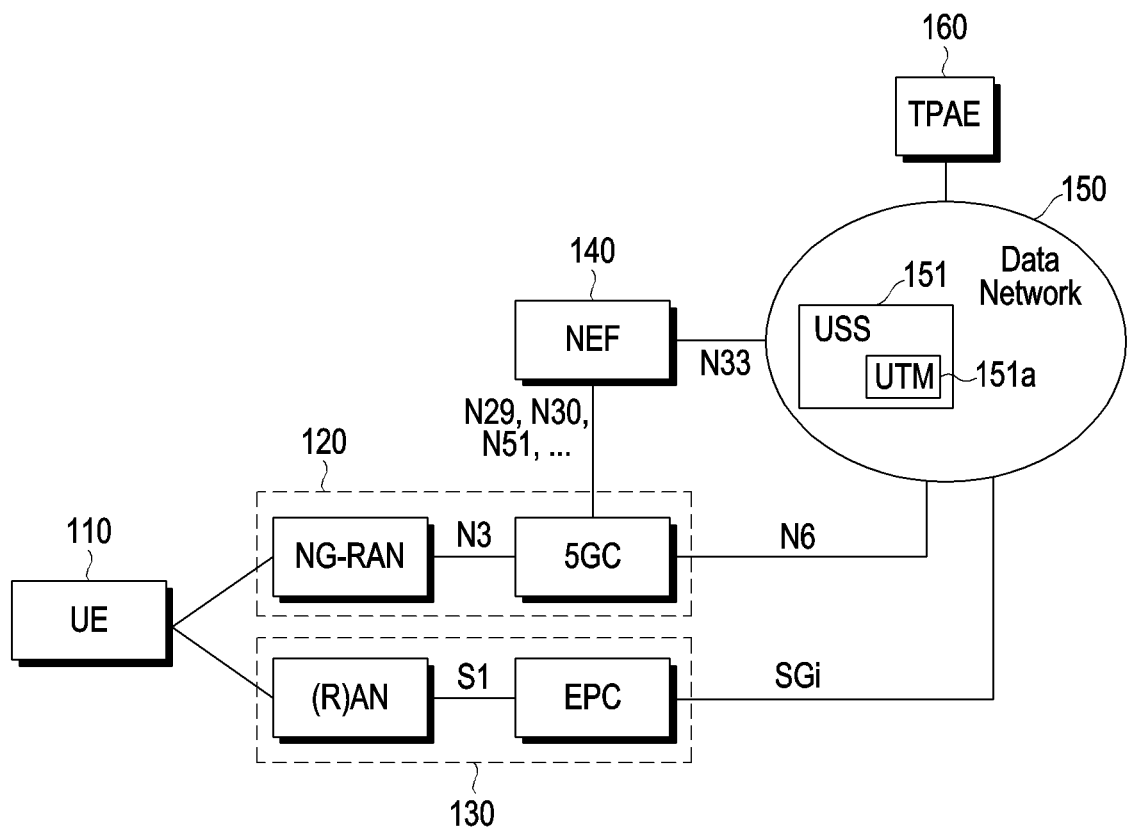
FIG. 1A is a view illustrating a communication system including a Fifth-generation system (5GS) and an evolved packet system (EPS) for an unmanned aerial vehicle (UAV) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operations are performed over the computer or other programmable data processing devices and operate the computer or other programmable data processing devices may provide operations for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element, such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more central procession units (CPUs) in a device or a security multimedia card.

According to embodiments of the disclosure, the base station may be an entity allocating resource to a user equipment (UE) and may be at least one of gNode B, gNB, eNode B, eNB, Node B, base station (BS), wireless access unit, base station controller, or node over network. The base station may be a network entity including at least one of an integrated access and backhaul-donor (IAB-donor), which is a gNB providing network access to UE(s) through a network of backhaul and access links in the NR system, and an IAB-node, which is a radio access network (RAN) node supporting NR backhaul links to the IAB-donor or another IAB-node and supporting NR access link(s) to UE(s). The UE is wirelessly connected through the IAB-node and may transmit/receive data to and from the IAB-donor connected with at least one IAB-node through the backhaul link.

The UE may include a terminal, mobile station (MS), cellular phone, smartphone, computer, or various devices capable of performing communication functions. In the disclosure, downlink (DL) refers to a wireless transmission path of signal transmitted from the base station to the terminal, and uplink (UL) refers to a wireless transmission path of signal transmitted from the terminal to the base station.

The description of embodiments of the disclosure focuses primarily on the radio access network, new RAN (NR), and the core network, packet core (5G system, or 5G core network, or NG core, or next generation core), which are specified by the 3rd generation partnership (3GPP) which is a wireless communication standardization organization. However, the subject matter of the disclosure, or slight changes thereto, may also be applicable to other communication systems that share similar technical backgrounds without departing from the scope of the disclosure, which would readily be appreciated by one of ordinary skill in the art.

For ease of description, some of the terms or names defined in the 3rd generation partnership project (3GPP) standards (standards for 5G, new radio (NR), long-term evolution (LTE), or similar systems) may be used. However, the disclosure is not limited by such terms and names and may be likewise applicable to systems conforming to other standards.

Hereinafter, the disclosure may also be applied to wireless communication systems for providing interworking of a network slice (or network slicing) in a wireless communication system. Specifically, the disclosure may also be applied to an interworking structure between a 5G network system and an EPS network system that provides a network slice function in a wireless communication system through the disclosure. In the disclosure, the 5G network system may be referred to as a first wireless communication system, and the EPS network system may be referred to as a second wireless communication system. The two systems may also be collectively referred to as a wireless communication system.

As used herein, terms denoting signals, terms denoting channels, terms denoting control information, terms denoting network entities, and terms denoting device components are provided as an example for ease of description. As used herein, terms for identifying nodes, terms denoting messages, terms denoting inter-network entity interfaces, and terms denoting various pieces of identification information are provided as an example for ease of description. The disclosure is not limited to the terms, and other terms equivalent in technical concept may also be used.

Further, although the disclosure describes various embodiments using terms used in some communication standards (e.g., 3rd generation partnership project (3GPP)), this is merely an example for description. Various embodiments of the disclosure may be easily modified and applied in other communication systems.

The 3GPP standard standardizes the system architecture and procedure of the 5G network, and the mobile communication carrier may provide various services over a 5G network. To provide each service, the mobile communication carrier needs to meet different service requirements (e.g., latency, communication range, data rate, bandwidth, reliability, or the like) for each service.

Further, in the 5G system, network slicing is supported, and traffic for different network slices may be processed by different protocol data unit (PDU) sessions. The PDU session may mean an association between a data network providing a PDU connection service and a UE. Network slicing may be understood as technology for logically configuring a network with a set of network functions (NF) to support various services with different characteristics, such as broadband communication services, massive IoT, V2X, or other mission critical services, and separating different network slices. Therefore, even when a communication failure occurs in one network slice, communication in other network slices is not affected, so that it is possible to provide a stable communication service. In the disclosure, the term "slice" may be interchangeably used interchangeably with "network slice". In such a network environment, the UE may access a plurality of network slices when receiving various services. Further, the network function (NF) may be a software instance running on hardware and be implemented as a virtualized function instantiated on a network element or an appropriate platform.

The mobile communication carrier may constitute the network slice and may allocate network resources suitable for a specific service for each network slice or for each set of network slices. A network resource may mean a network function (NF) or logical resource provided by the NF or radio resource allocation of a base station.

For example, a mobile communication carrier may configure network slice A for providing a mobile broadband service, network slice B for providing a vehicle communication service, and network slice C for providing an IoT service. In other words, the 5G network may efficiently provide a corresponding service to a UE through a specialized network slice suited for the characteristics of each service.

A mobile communication carrier may operate a 5G network and an EPS network (or also referred to as an LTE-based network or a 4G network) together. The UE may access the 5G network, use the service, and then move to the EPS network. Alternatively, the UE may access the EPS network, use the service, and then move to the 5G network. Interworking between networks (between systems) related to the movement of the UE may be referred to as 5G core (5GC)-EPC interworking or 5G system (5GS)-EPS interworking.

Figure 1B:
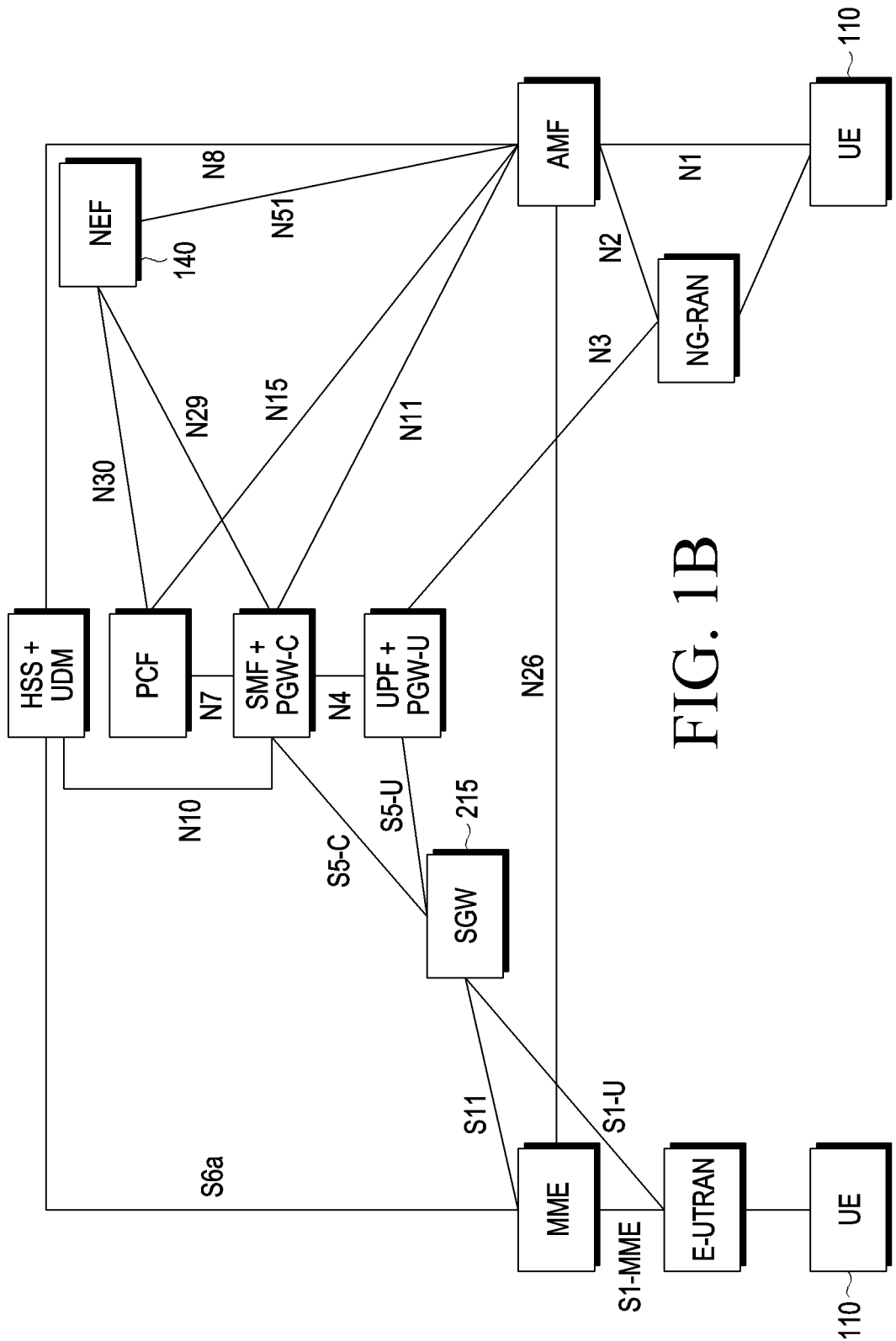
FIG. 1B is a view illustrating a structure of a wireless communication system supporting interworking between a 5GS and an EPS according to an embodiment of the disclosure.

In the disclosure, the network technology may refer to the standards (e.g., TS 23.501, TS 23.502, TS 23.503, or the like) defined by the international telecommunication union (ITU) or 3GPP, and each of the components included in the network architecture of FIGS. 1A and 1B may mean a physical entity or may mean software that performs an individual function or hardware combined with software. Reference characters denoted by Nx in FIGS. 1A and 1B, such as N1, N2, N3, . . . , indicate known interfaces between NFs in the 5G core network (CN), and the relevant descriptions may be found in the standard specifications (TS 23.501). Therefore, a detailed description will be omitted.

Described below are 3GPP standards for a communication method and device for supporting operation of an unmanned aerial vehicle in a wireless communication system according to various embodiments of the disclosure.

The disclosure relates to a wireless communication system to provide an unmanned aerial system service and specifically proposes a method for stably/efficiently signaling information related to authentication created due to the mobility of an unmanned aerial vehicle (UAV) through signaling through the UAV, an unmanned aerial vehicle controller (UAVC) controlling the UAV, and UAS traffic management (UTM) which is a network entity controlling the unmanned aerial system (UAS) including at least one of the UAV and the UAVC in a 5G system. Further, in the disclosure, in communication between the UAS and the UTM, the UAS may perform subscription to the UTM for transmission and reception of control information and/or user data. When there are only subscription expose settings when the UAS/UAV performs subscription to the UTM, communication connection of the UAV may be stopped/released, and a method for addressing such issue is proposed.

In the disclosure, the UAV may be various unmanned mobile devices equipped with a communication device, such as drones. However, it should be noted that the UAV of the disclosure is not limited to drones. Currently, in communication methods for operating a drone, no method using a cellular network represented by mobile communication is supported. Most drone operation techniques adopt an operation method through a drone and a drone controller using the protocol provided by the manufacturer through a short-range wireless communication network, such as radio frequency (RF), Bluetooth, or wireless fidelity (Wi-Fi). Therefore, there is a need for research for issues and enhancements related to the mobility of drones and problems that couldn't be predicted for conventional short-range communication networks to control UAVs in a wireless communication system.

In the disclosure, UAV collectively refers to aircraft that may fly along a specific orbit, with no pilot aboard, remotely controlled or autonomously for achieving its purpose, such as hobby or commercial drones controllable within a short distance. Additionally, the UAV according to the disclosure is equipped with a communicable device, such as a mobile communication network, Wi-Fi, or Bluetooth, and is thus capable of communication between externally located entities, such as the controller of the UAV, the short-range communicable UAV, and/or a control center.

In the disclosure, the terminal may include at least one of a UAV and a UAVC to control the UAV. A form capable of operating an UAV, including the UAV and the UAVC, is referred to as a UAS. The terminal may include a mobile equipment (ME). In the disclosure, the UE may be referred to by various names, such as UAV, UAVC (or UAV controller), UAS, and UAV/UAVC. Further, the terminal may include a wireless device capable of accessing various wireless networks, such as a 5G system or a Wi-Fi network.

The UAVC may be a hardware device or a form of software operated over a cloud network or server. It may have the capability of accessing a 3GPP network through an LTE (evolved universal mobile telecommunications system (UMTS) terrestrial radio access (E-UTRA), GSM/EDGE radio access network (GERAN), or UTRA), a 5G network, or a non-3GPP network.

Referring to the 3GPP standard, TS 22.125, a UAS includes a UAV and a UAV controller corresponding to a UAVC. Additionally, the UAS may be connected with a UTM or UAS service supplier (USS) system that plays a role to manage UAS(s), and the UTM or USS may provide various functions, such as authentication of the UAS, identification and authentication of the UAV controller, providing static or real-time information necessary for unmanned aerial control, permission through identification of a flight route purpose, and forced transfer of UAS control authority due to emergency. Further, in the disclosure, the USS may include the UTM function. It is needed to efficiently provide a network service so that the UAV ad the UAV controller constituting the UAS supports network connectivity and devices constituting each UAS is able to be managed via the UTM/USS in the wireless communication system.

Further, in the disclosure, the wireless communication system regards the UAV as a general UE to perform a UE registration procedure on the UAV and, additionally, the UTM or USS located outside may perform an authentication procedure related to the flight of the UAV. The UTM or USS may cancel the authentication result or update related data.

FIG. 1A is a view illustrating a communication system including a 5GS and an EPS for a UAV according to an embodiment of the disclosure.

5GS means a 5G system defined in the 3GPP standard, and an evolved packet system (EPS) means an LTE system defined in the 3GPP standard. The 5GS includes an NG-RAN corresponding to a base station and a 5GC corresponding to a core network, and the EPS includes an (R)AN corresponding to a base station and an evolved packet core (EPC) corresponding to a core network. In FIG. 1A, a UE 110 may receive the UAS service through the 5GS 120 or an EPS 130.

Referring to FIG. 1A, the UE 110 may include at least one of a UAV and a UAVC (or a UAV controller) as described above. Further, the UE 110 may include a mobile equipment (ME) capable of performing communication by accessing the 5GS 120 or EPS 130. The ME may be understood as a device except for the UMTS subscriber identity module (USIM) in a general UE. Accordingly, the UE 110 may be a network entity including at least one of UAV, UAVC, USS, or ME.

Referring to FIG. 1A, the 5GS 120 may include a radio access network (NG-RAN) and a 5G core network (5GC), and the NG-RAN may be a base station (e.g., gNB or integrated access and backhaul (IAB)) supporting radio access technology in the 5G system. The base station may interwork with the core network (i.e., 5GC) to transmit the control information and/or data received from the UE to other entity(ies) and receive a configuration for the UE 110 from the 5GC, transmit/receive control information and/or data between the UE 110 and the 5GC, or perform various procedures for management including authentication of the UE 110. The UE may connect to the data network using a technique for using a sidelink, such as proximity service (Prose) for direction communication between the UE 110 and another UE without connection to the base station of the NG-RAN or a non-3GPP radio access technique, such as Wi-Fi or Bluetooth.

As defined in the 3GPP NR standard, the 5GC may include network entities, such as access and mobility management function (AMF), session management function (SMF), user plane function (UPF), and unified data management (UDM).

The AMF is an entity for managing access and mobility of the UE 110 in the 5G system. The AMF may serve as a UE-core network endpoint through which the UE 110 connects with other entity(s) of the 5GC through the NG-RAN. As an example, the AMF may perform such functions as registration of the UE 110, connection, reachability, mobility management, access identification/authentication, and mobility event generation.

The SMF may perform a management function for a protocol data unit (PDU) session of the UE 110. For example, the SMF may perform such network functions as session management functions of establishing, modifying, or releasing a session and maintaining a tunnel between the UPF and the base station necessary therefor, the functions of allocating and managing an Internet protocol (IP) address of the terminal, address resolution protocol (ARP) proxy functions, selection and control of the user plane, control of traffic processing on the UPF, and billing data gathering control.

The UPF may play a role to process the user data of the UE 110 and may process packets so that packets generated by the UE 110 are transferred to an external data network 150 or the data received from the external data network 150 is transferred to the UE. The UPF may perform network functions, such as acting as an anchor between radio access technologies (RATs), providing connection with PDU sessions and external data networks, packet routing and forwarding, packet inspection, application of user plane policy, creating a traffic usage report, or buffering.

The UDM may perform network functions, such as generation of authentication and key agreement (AKA) authentication information for 3GPP security, processing of the user identifier (ID), reverse concealment of the secured user identifier (subscriber concealed ID (SUPI)), management of the list of network functions (NFs) currently supporting the UE 110, and subscription management. The unified data repository (UDR) may perform the functions of storing and providing subscription information managed by the UDM, structured data for exposure, and application data related to NEF or service.

Referring to FIG. 1A, an NEF 140 may be responsible for transmitting or receiving an event occurring in the 5G system and a supported capability to/from the outside. For example, the NEF may perform network functions, such as safe supply of external application information to the core network (5GC), conversion of internal/external information, and storing in the UDR (not shown) and then redistributing the information received from other NFs. In an example of the disclosure, the NEF 140 may perform a network function of exposing the service provided by the 5GS 120 to a USS 151. The USS 151 may exist outside (or inside) the 5GS 120. The USS 151 may perform, e.g., UAV flight permission and/or revocation of UAV flight permission, pairing permission between UAV and UAVC and/or revocation of pairing permission between UAV and UAVC, location reporting, QoS and/or traffic management for command and control (C2) communication for UAV and/or UAVC, through the service provided by the 5GS 120 through the NEF 140. In the disclosure, the NEF may be referred to as a UAS NF.

In the disclosure, the UAS service supplier (USS) 151 may be included in the data network 150 and transmit/receive data with the UE 110. When the UE 110 is to use the UAS service, the 5GC may perform a UAV USS authentication and authorization (UUAA) procedure which is a procedure for authentication and authorization to allow the UE 110 (or UAV) to communicate with the USS 151 through the wireless communication system.

The UUAA procedure may be performed by the AMF during registration of the UE 110 (UUAA-MM procedure) or by the SMF+PGW-C (i.e., combo node of SMF and PGW-C) during PDU session establishment or PDN connection establishment of the UE 110 (UUAA-SM procedure). The UAS service may be provided through the EPC based on the SMF+PGW-C node. In the UUAA procedure, the UE 110 provides the civil aviation administration (CAA)-level UAV ID (identifier (ID) allocated by the USS 151 to the UE 110 (or UAV) to be able to use the UAS service) to the 5GS and, if the UDM has aerial subscription information (i.e., aerial subscription data, subscription information provided by the communication carrier to be able to use the UAS service through the wireless communication system) about the UE 110, the authentication and authorization procedure succeeds.

If the aerial subscription information about the UE 110 (or UAV) in the UDM is changed so that the communication carrier is unable to provide the UAS service any longer while the UE 110 (or UAV) succeeding in the UUAA procedure is using the UAS service through the wireless communication system, the wireless communication system may notify the USS 151 and the UE 110 that the authentication result according to the prior UUAA procedure for the UE 110 (or UAV) has been revoked. Otherwise, the USS 151 cannot recognize the stop/release of the connection even when the connection of the UE 110 (or UAV) with the 5GS and control plane and/or user plane has been stopped/released and be unable to continue transmitting control information and/or data to the UE 110 (or UAV). The disclosure proposes a method for stably managing a UAS service by the wireless communication system notifies the USS 151 and UE 110 of a change in aerial subscription information when the UE 110 (or UAV) is unable to use the UAS service due to the change in the aerial subscription information about the UE 110 (or UAV) in the UDM while the UE 110 (or UAV) is using the UAS service in the wireless communication system through the UUAA procedure and canceling the prior UUAA result which succeeded on the UE 110 (or UAV) to stably manage the UAS service. Specific embodiments are described below.

In the disclosure, embodiments are described under the assumption that the USS 151 includes the UTM 151*a*, but the UTM may be configured separately from the USS 151 and the data network 150. Accordingly, it should be noted that embodiments of the disclosure are not limited to the USS 151 including the UTM 151*a*. Hereinafter, for convenience of description, the USS including the UTM will be simply referred to as the USS.

Referring to FIG. 1A, the USS 151 may serve to control the traffic of the UAV. The traffic may include network traffic, and traffic control may include controlling the operation of actual physical UAVs. The USS 151 may perform functions, such as connection authentication of the UE 110 (or UAV), configuration authentication of the UE 110 (or UAV), provision of information for efficient operation of the UAV, authentication of the UAV which is scheduled to fly and route identification, identification of the current route and location of the UAV, and control of the UAV at emergency. The entity managing the USS 151 may be a business operator, government, or public institution. In the disclosure, the USS 151 may provide information related to UAV operation to the control plane through the NEF 140. Communication between the USS 151 and the NEF 140 may use the N33 interface defined in the 3GPP standard. The interfaces indicated by Nx, Sx, and SGi in FIG. 1A exemplify interfaces defined by the 3GPP standard, and information exchange and control information exchange between network entities may be performed using procedures, interfaces, and protocols defined in the relevant 3GPP standard. However, the disclosure is not limited to the interfaces illustrated in FIG. 1A, and new interfaces replacing the exemplified interfaces may also be used.

Referring to FIG. 1A, a third party authorized entity (TPAE) 160 is a device that requests information about the UE 110 (or UAV and/or UAVC) outside the wireless communication system and receives the information. As an example, the TPAE 160 may be various communication devices for police officers, public officials, or UAV traffic control. The TPAE 160 may communicate with the wireless communication system of FIG. 1A over the Internet or other networks.

FIG. 1B is a view illustrating a structure of a wireless communication system supporting interworking between a 5GS and an EPS according to an embodiment of the disclosure.

The unmanned aerial system service according to an embodiment may also be applied to an interworking structure between 5GS and EPS referring to FIG. 1B.

FIG. 1B illustrates an interworking structure of 5GS and EPS in a non-roaming situation. The 5GS may include an NR base station (NG-RAN) or next-generation node B (gNB)), an SMF, a UPF, a PCF, an NSSF, a UDM, or a UDR. EPS may include, e.g., an E-UTRA base station (e.g., evolved universal mobile telecommunications system (UMTS) terrestrial radio access network (E-UTRAN) or evolved node B (eNB)), an MME, a serving gateway (SGW), a packet data network gateway (PGW) (which is composed of PGW-U and PGW-C), a policy and charging rule function (PCRF), and a home subscriber server (HSS).

The AMF and the MME are NFs that manage wireless network access and mobility for the UE 110. The SMF, SGW, and PGW are NFs that manage a session for the UE. The session information may include quality of service (QoS) information, charging information, and packet processing information. The UPF and PGW are NFs that process user plane traffic and are controlled by the SMF and SGW. The PCF and PCRF are NFs that manage operator policy and/or PLMN policy for providing a service in a wireless communication system. Further, the PCF may be divided into a PCF in charge of an access and mobility (AM) policy and UE policy and a PCF in charge of session management (SM) policy. The PCF in charge of AM/UE policy and the PCF in charge of SM policy may be logically or physically separated NFs or may be logically or physically one NF. The UDM and HSS are NFs for storing and managing subscriber information (UE subscription) of the UE. The UDR is an NF or a database (DB) that stores and manages data. The UDR may store subscription information for the UE and may provide the UDM with the subscription information for the UE. Further, the UDR may store operator policy information and may provide operator policy information to the PCF. The NSSF may be an NF that selects the network slice instance serving the UE or determines the network slice selection assistance information (NSSAI).

The instance may refer to a state in which a specific NF exists in the form of a software code and is executable by being assigned a physical or/and logical resource from a physical computing system (e.g., a specific computing system present on a core network) to perform the function of the NF. For example, AMF instance, SMF instance, and NSSF instance may mean a state in which a physical and/or logical resource is assigned from a specific computing system present on a core network to perform the AMF, SMF, and NSSF operation, respectively. Thus, the AMF instance, SMF instance, and NSSF instance which receive and use a physical and/or logical resource from a specific computing system present on a network may perform the same operations as when there a physical AMF, SMF, and NSSF device exists.

The UDM of 5GS and HSS of EPS may be configured as one combo node (referred to as UDM+HSS). The UDM+HSS node may store subscriber information for the UE 110. The SMF of 5GS and PGW-C of EPS may be configured as one combo node (referred to as SMF+PGW-C). Instead of the PCF shown in FIG. 1B, the PCF of 5GS and the PCRF of the EPS may be configured as one combo node (referred to as a PCF PCRF). The UPF of 5GS and PGW-U of EPS may be configured as one combo node (referred to as UPF+PGW-C). The UE 110 may access the MME of the EPS through the E-UTRA base station and use the EPS network service. Further, the UE may access the AMF of 5GS through the NR base station to use the 5GS network service.

In this way, one NF or network entity may simultaneously support different network systems, and such NF, network node, or network entity may be referred to as the previously described combo node, combo NF, combined node, combined NF, interworking node, or interworking NF. Further, the function of the NF exemplified as the combo node may be implemented through interworking between two or more network entities. Further, NFs simultaneously supporting different network systems may be indicated using the symbol "+" or "/" for convenience of illustration and description. For example, when SMF and PGW-C are configured as one combo node, they may be expressed as PGW-C/SMF, PGW-C+SMF, SMF/PGW-C, or SMF+PGW-C.

The UE connects to the data network (e.g., a network that provides Internet service) through the 5GS or EPS system and establishes a session. Each data network may be identified using an identifier, such as data network name (DNN) or access point name (APN). To distinguish data networks, the 5GS may use the DNN and the EPS may use the APN. The DNN and APN may be used to determine, e.g., the NF related to the user plane, inter-NF interface, and user policy when the UE establishes a session with the network system. The DNN and APN may be understood as equivalent information and transfer the same information. The DNN may be used, e.g., to select SMF and UPF(s) for the PDU session and may be used to select the interface(s) (e.g., N6 interface) between the data network and the UPF for the PDU session. The DNN may be used to determine a policy of a mobile communication carrier to be applied to the PDU session.

In the 5GS, the UE 110 may be connected to one data network through at least one network slice. In a case where the UE moves to the EPS while establishing a PDU session connection through a plurality of network slices to a certain data network in the 5GS, the UE may select one network slice according to determination of the SMF+PGW-C node and establish a PDU session with the data network.

Further, in the disclosure, the NEF 140 may be connected with the PCF, SMF+PGW-C, and/or AMF to perform the network exposure function.

Proposed is a network operation in which in a case where the EPS or 5GS establishes a session connection so that a change is made to the subscription information about the UE using the unmanned aerial system service, the change is applicable to the session in connection. Here, the UE may be a UE registered as a subscriber to the EPS or 5GS.

Hereinafter, in the embodiments of FIGS. 2A, 2B, 3A, 3B, 4A, 4B, 5A, and 5B the basic operations of the network entities, UE, AMF, SMF, UPF, UDM, NEF, and USS, are the same as the operations of the network entities corresponding to the above-described FIGS. 1A and 1B, and a detailed description thereof is omitted. In the following description, the term "UAV UE" may be understood as a UE including at least one of a UAV and a UAVC as described in the example of FIG. 1A. Further, in the embodiments of FIGS. 2A, 2B, 3A, 3B, 4A, 4B, 5A, and 5B, service names of messages transmitted/received between network entities may refer to names defined in the 3GPP standard (TS 23.502).

Figure 2A:
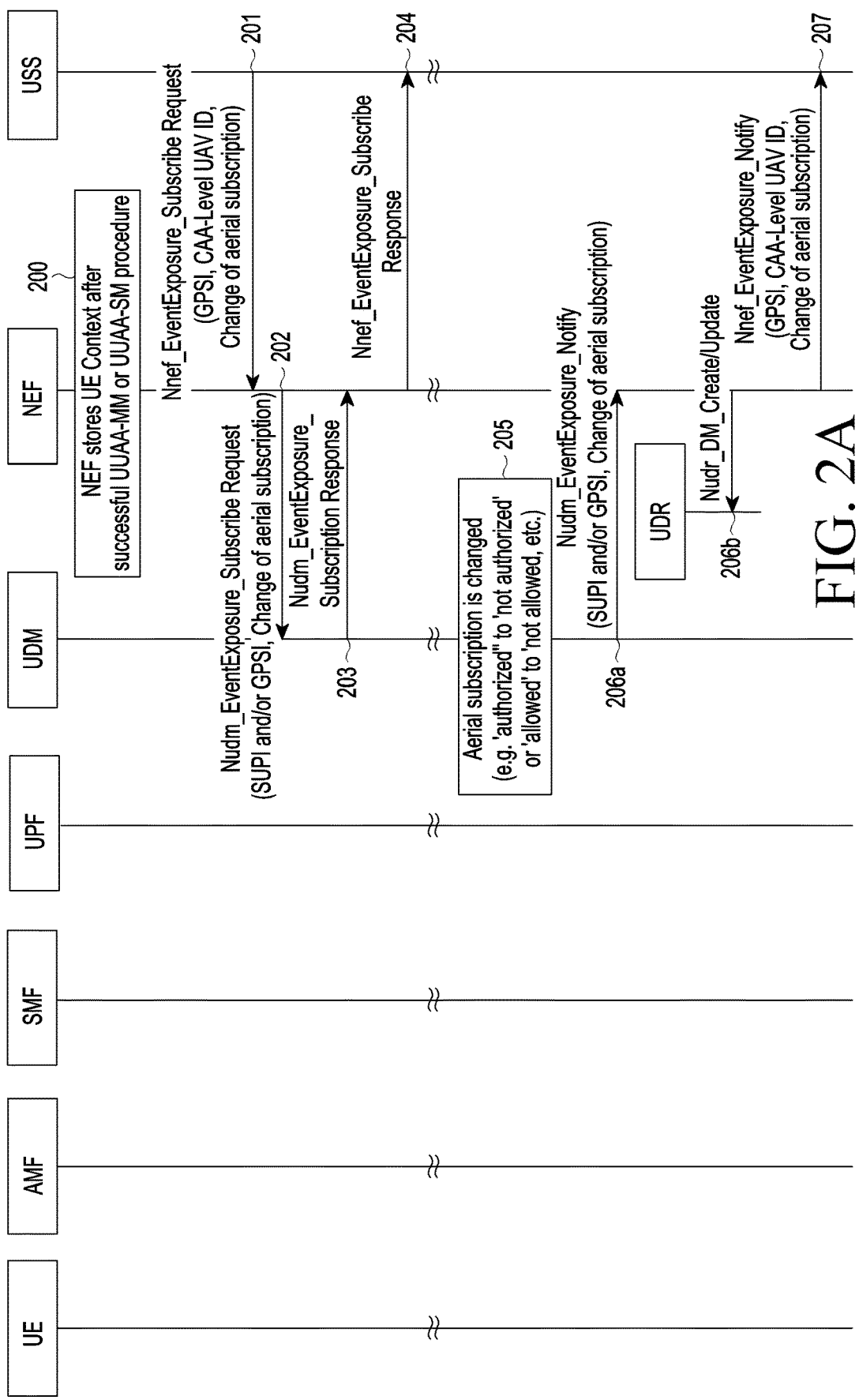
FIGS. 2A and 2B are views illustrating a UAV USS authentication and authorization (UUAA) revocation procedure to notify of a change in aerial subscription information using an event exposure service of a unified data management (UDM) in a wireless communication system according to various embodiments of the disclosure.
Figure 2B:
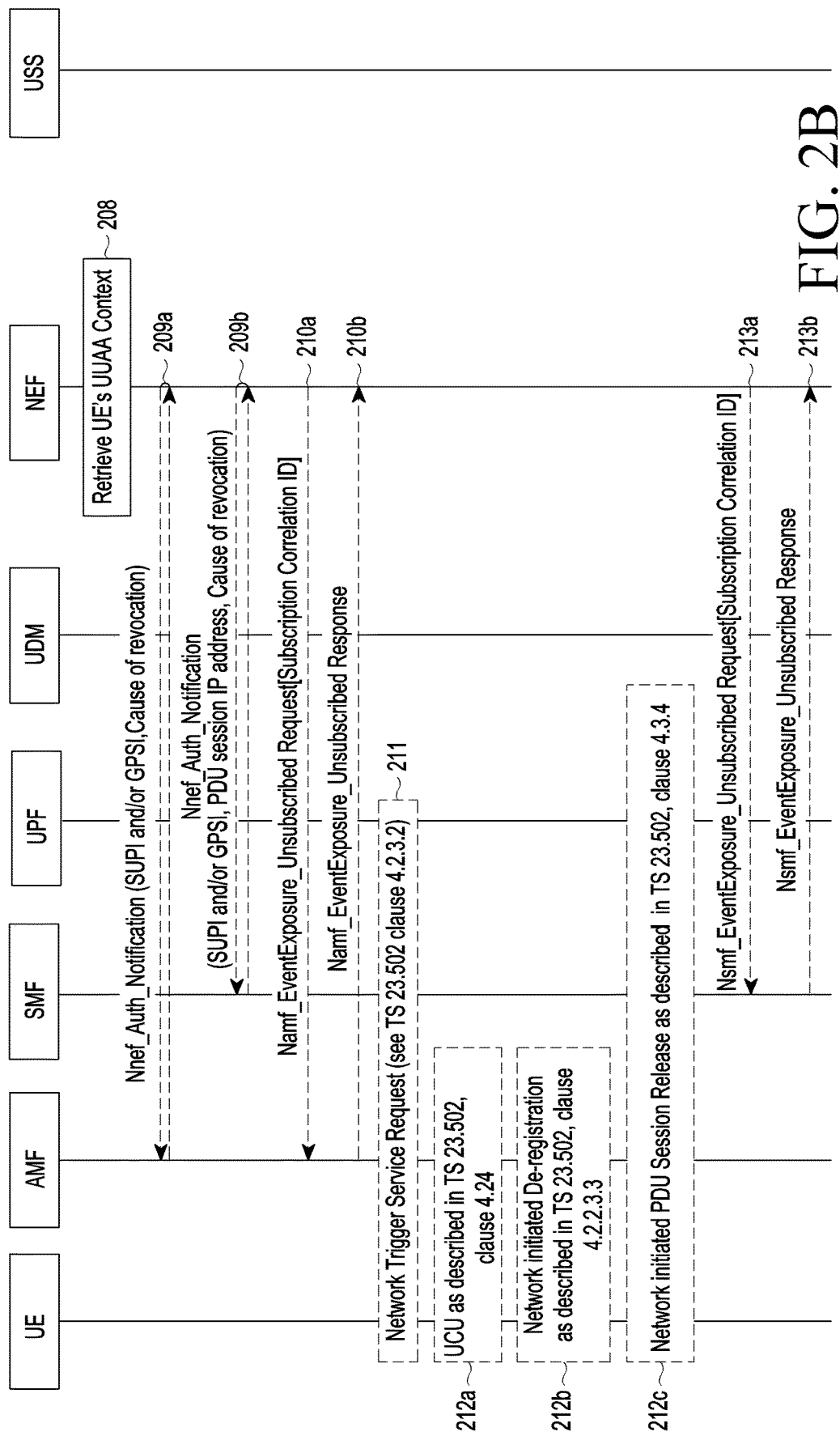

FIGS. 2A and 2B illustrate a UUAA revocation procedure to notify of a change in aerial subscription information using an event exposure service of a UDM in a wireless communication system according to various embodiments of the disclosure.

Referring to FIGS. 2A and 2B, Operation 200: When a UUAA procedure (UUAA-MM procedure or UUAA-SM procedure) which is a procedure for authentication and authorization to allow the UAV UE to communicate with the USS through the wireless communication system succeeds, the NEF may store the UUAA context of the UAV UE.

Operation 201: The USS may transmit a subscription request to the NEF to notify of an occurrence of a change in the aerial subscription information about the UAV UE of operation 200. The USS may transmit an Nnef_EventExposure_Subscribe Request message. The USS may provide the NEF with an Nnef_EventExposure_Subscribe Request message including an event that may be detected by the UDM according to a change in generic public subscription identifier (GPSI), CAA-Level UAV ID, and aerial subscription information. The GPSI is an identifier used to process a 5G system subscription in another network outside the 5G system, and may be used inside and outside the 5G system. For a specific definition of the GPSI, refer to TS 23.501 in the 3GPP NR standard.

An example of the event that may be recognized by the UDM according to the change in the aerial subscription information may include the "Change of aerial subscription" event of Table 1 below. Table 1 exemplifies the list of events for monitoring capability and, for convenience purposes, the table is separated into Table 1A to Table 1D, which may be collectively referred to as Table 1.

TABLE 1A

| Event | Detection criteria | Which NF detects the event |
|---|---|---|
| Loss of Connectivity | Network detects that the UE is no longer reachable for either signalling or user plane communication (see NOTE 4). The AF may provide a Maximum Detection Time, which indicates the maximum period of time without any communication with the UE after which the AF is to be informed that the UE is considered to be unreachable (see NOTE 7). | AMF |
| UE reachability | Detected when the UE transitions to CM- CONNECTED state or when the UE will become reachable for paging, e.g., Periodic Registration Update timer. It indicates when the UE becomes reachable for sending downlink data to the UE. The AF may provide the following parameters: 1) Maximum Latency; 2) Maximum Response Time; 3) Suggested number of downlink packets. (see NOTE 5 and NOTE 7). This event requires the Reachability Filter set to UE reachable for DL traffic" (see clause 5.2.2.3.1-1). For the usage of this event, see clauses 4.2.5.2 and 4.2.5.3. When requesting UE reachability monitoring, the AF may in addition request Idle Status Indication to be included in the UE reachability event reporting. | AMF, UDM |
| Location Reporting | This event is detected based on the Event Reporting Information Parameters that were received in the Monitoring Request (one- time reporting, maximum number of reports, maximum duration of reporting, periodicity, etc., as specified in clause 4.15.1). It reports either the Current Location or the Last Known Location of a UE. When AMF is the detecting NF: One-time and Continuous Location Reporting are supported. For Continuous Location Reporting the serving node(s): sends a notification every time it becomes aware of a location change, with the granularity depending on the accepted accuracy of location (see NOTE 1). For One-time Reporting with immediate reporting flag set, AMF reports the Last Known Location immediately. | AMF, GMLC |

TABLE 1A-continued

| Event | Detection criteria | Which NF detects the event |
|---|---|---|
| | When AMF is the detecting NF: If the immediate reporting flag is not set, the AMF reports the UE Current Location (In case the AMF does not have the UE current location in the granularity as requested by the location report, the AMF retrieves the information via NG-RAN Location reporting procedure as defined in clause 4.10), When GMLC is the detecting NF: Immediate and Deferred Location Reporting is supported. For Deferred Location Reporting the event types UE availability, Area, Periodic Location and Motion are supported. | |
| Change of SUPI- PEI association | This event is detected when the association between PEI and subscription (SUPI) changes (USIM change). | UDM |
| Roaming status | This event is detected based on the UE's current roaming status (the serving PLMN and/or whether the UE is in its HPLMN) and notification is sent when that status changes. (see NOTE 2). If the UE is registered via both 3GPP and N3GPP Access Type, then both instances of Roaming status are included. | UDM |
| Communication failure | This event is detected when RAN or NAS level failure is detected based on connection release and it identifies RAN/NAS release code. | AMF |
| Availability after Downlink Data Notification failure | This event is detected when the UE becomes reachable again after downlink data delivery failure. When requesting Availability after Downlink Data Notification failure monitoring, the AF may in addition request Idle Status Indication to be included in the UE reachability event reporting. | AMF |
| PDU Session Status | This event is detected when PDU session is established or released. (see NOTE 6) | SMF |
| Number of UEs present in a geographical area | This event is detected based on the Event Reporting Information Parameters that were received in the Monitoring Request (Level of aggregation, Sampling ratio, see clause 4.15.1). It indicates the number of UEs that are in the geographical area described by the AF. The AF may ask for the UEs that the system knows by its normal operation to be within the area (Last Known Location) or the AF may request the system to also actively look for the UEs within the area (Current Location). | AMF |
| CN Type change | The event is detected when the UE moves between EPC and 5GC. It indicates the current CN type for a UE or a group of UEs when detecting that the UE switches between being served by a MME and an AMF or when accepting the event subscription. (see NOTE 3) | UDM |
| Downlink data delivery status | It indicates the downlink data delivery status in the core network. Events are reported at the first | SMF |

TABLE 1A-continued

| Event | Detection criteria | Which NF detects the event |
|---|---|---|
| | occurrence of packets being buffered, transmitted or discarded, including: Downlink data in extended buffering, including: First data packet buffered event Estimated buffering time, as per clause 4.2.3.3 First downlink data transmitted event First downlink data discarded event | |
| UE reachability for SMS delivery | This event is detected when an SMSF is registered for a UE and the UE is reachable as determined by the AMF and the UDM. This enables the UE to receive an SMS. See clauses 4.2.5.2 and 4.2.5.3. | UDM |
| Number of registered UEs or established PDU Sessions | It indicates the current number of registered UEs or established PDU Sessions for a network slice that is subject to Network Slice Admission Control. | NSACF |
| Area Of Interest | It indicates change of the UE presence in the Area Of Interest. | AMF, GMLC |
| Change of aerial subscription | This event is detected when the aerial subscription of the UAV UE changes. | UDM |

(NOTE 1):
Location granularity for event request, or event report, or both could be at cell level (Cell ID) or TA level. The granularity can also be expressed by other formats such as geodetic uncertainty shapes (e.g. polygons, circles, etc.) or civic addresses (e.g. streets, districts, etc.) which can be mapped by NEF to AMF specific granularity levels.
(NOTE 2):
Roaming status means whether the UE is in HPLMN or VPLMN based on the most recently received registration state in the UDM.
(NOTE 3):
CN type of CN Type change event is defined in clause 5.17.5.1 of TS 23.501 [2].
(NOTE 4):
In the case of UDM service operation information flow, the UDM should set the subscribed periodic registration timer to a smaller value than the value of Maximum Detection Time, since the value of the mobile reachable timer is larger than the value of the periodic registration timer.
(NOTE 5):
Maximum Latency, Maximum Response Time and Suggested number of downlink packets are defined in clause 4.15.6.3a.
(NOTE 6):
The NEF makes a mapping between the 5GS internal event "PDU Session Status" and the T8 API event "PDN Connectivity Status".
(NOTE 7):
The preferred method for provisioning Network Configuration Parameters is External Parameter Provisioning specified in clause 4.15.6.3a. Provisioning event specific parameters as part of Monitoring Request is expected to be used only by the AF that does not support Parameter Provisioning procedure specified in clause 4.15.6.3a.

Operation 202: Upon receiving the request of operation 201, the NEF may request the UDM to subscribe to the aerial subscription information change event. The NEF may send an Nudm_EventExposure_Subscribe Request message to the UDM. The NEF may provide the NEF with an event that the UDM may detect according to a change in subscription permanent identifier (SUPI) and/or GPSI, and aerial subscription information. The SUPI is secure identification information, a unique identifier assigned to each subscriber to the 5G system, and may be used in the 5G system. For a specific definition of the SUPI, refer to TS 23.501 in the 3GPP NR standard.

Operation 203: Upon receiving the request of operation 202, the UDM may transmit a result of the request to the NEF. For example, when the UDM accepts the NEF request, the UDM may provide the NEF with an Nudm_EventExposure_Subscription Response message including the identifier (Subscription Correlation ID) for the NEF request of operation 202 and/or the expiry time according to the policy of the communication carrier.

Operation 204: Upon receiving the result of operation 203, the NEF may transmit the result of the request of the USS to the USS in operation 201. For example, when the UDM accepts the request of the NEF in operation 203 and the NEF accepts the request of the USS, an Nnef_EventExposure_Subscription Response message including the identifier (subscription correlation ID) for the request of the USS in operation 201 and/or expiry time according to the policy of the communication carrier may be provided to the USS.

Operation 205: The UDM accepting the subscription request of operation 202 may recognize the occurrence of the change in the aerial subscription information about the UAV UE based on the subscription information about the UE as in the example of Table 2 managed by the UDM. For example, when a change is made to the aerial subscription information may correspond to when in Table 2, the value of the aerial subscription information (i.e., aerial subscription data) is changed from 'authorized' to 'no authorized' or from 'allowed' to 'not allowed.' An example of the data key for accessing the aerial subscription information about the UAV UE of the UDM may be defined as SUPI as shown in Table 3 below. Table 2 below shows an example of a configuration of the UE's subscription information managed by the UDM, and the UE's subscription information may include aerial subscription information according to an embodiment.

Table 2 below shows an example in which when the aerial subscription information is included in the "access and mobility subscription data" subfield of the subscription data type managed by the UDM, or when it is included in the "session management data" subfield, a new subscription data type for the UAS service is defined. In each case, as shown in Table 3, the data key necessary upon accessing data may be defined to differ, and the time accessible may be varied into during the registration procedure or during the session establishment procedure.

Table 2 exemplifies UE subscription data types and, for convenience purposes, the table is separated into Table 2A to Table 21, which may be collectively referred to as Table 2.

TABLE 2A

| Subscription data type | Field | Description |
|---|---|---|
| Access and Mobility Subscription data (data needed for UE Registration and Mobility Management) | GPSI List | List of the GPSI (Generic Public Subscription Identifier) used both inside and outside of the 3GPP system to address a 3GPP subscription (see NOTE 9). |
| | Internal Group ID- list | List of the subscribed internal group(s) that the UE belongs to. |
| | Subscribed UE- AMBR | The maximum aggregated uplink and downlink MBRs to be shared across all Non- GBR QoS Flows according to the subscription of the user. |

TABLE 2A-continued

| Subscription data type | Field | Description |
|---|---|---|
| | Subscribed UE-Slice-MBR(s) | List of maximum aggregated uplink and downlink MBRs to be shared across all GBR and Non-GBR QoS Flows related to the same S-NSSAI according to the subscription of the user. There is a single uplink and a single downlink value per S-NSSAI. |
| | Subscribed S-NSSAIs | The Network Slices that the UE subscribes to. In the roaming case, it indicates the subscribed Network Slices applicable to the Serving PLMN (NOTE 11). |
| | Default S-NSSAIs | The Subscribed S-NSSAIs marked as default S-NSSAI. In the roaming case, only those applicable to the Serving PLMN (NOTE 12). |
| | S-NSSAIs subject to Network Slice-Specific Authentication and Authorization | The Subscribed S-NSSAIs marked as subject to NSSAA. When present, the GPSI list shall include at least one GPSI. |
| | Network Slice Simultaneous Registration Group Information | Optionally, for each S-NSSAI in the Subscribed S-NSSAIs, one or more value of Network Slice Simultaneous Registration Group(s) (NOTE 11) associated with the S-NSSAI. |
| | UE Usage Type | As defined in clause 5.15.7.2 of TS 23.501 [2]. |
| | RAT restriction | 3GPP Radio Access Technology(ies) not allowed the UE to access. |
| | Forbidden area | Defines areas in which the UE is not permitted to initiate any communication with the network. |
| | Service Area Restriction | Indicates Allowed Areas in which the UE is permitted to initiate communication with the network, and Non-allowed areas in which the UE and the network are not allowed to initiate Service Request or SM signalling to obtain user services. |
| | Core Network type restriction | Defines whether UE is allowed to connect to 5GC and/or EPC for this PLMN. |
| | CAG information | The CAG information includes Allowed CAG list and, optionally an indication whether the UE is only allowed to access 5GS via CAG cells as. defined in clause 5.30.3 of TS 23.501 [2]. |
| | GAG information Subscription Change Indication | When present, indicates to the serving AMF that the CAG Information in the subscription data changed and the UE must be updated. |
| | RFSP Index | An index to specific RRM configuration in the NG-RAN. |
| | Subscribed Periodic Registration Timer | Indicates a subscribed Periodic Registration Timer value, which may be influenced by e.g. network configuration parameter as specified in clause 4.15.6.3a. |
| | Subscribed Active Time | Indicates a subscribed active time value, which may be influenced by e.g. network configuration parameter as specified in clause 4.15.6.3 a. |
| | MPS priority | Indicates the user is subscribed to MPS as indicated in clause 5.16.5 of TS 23.501 [2]. |
| | MCX priority | Indicates the user is subscribed to MCX as indicated in clause 5.16.6 of TS 23.501 [2]. |
| | AMF-Associated Expected UE Behaviour parameters | Information on expected UE movement and communication characteristics. See clause 4.15.6.3 |
| | Steering of Roaming | List of preferred PLMN/access technology combinations and/or Credentials Holder controlled prioritized lists of preferred SNPNs and GINs or HPLMN/Credentials Holder indication that no change of the above list(s) stored in the UE is needed (see NOTE 3). Optionally includes an indication that the UDM requests an acknowledgement of the reception of this information from the UE. |
| | SoR Update Indicator for Initial Registration | An indication whether the UDM requests the AMF to retrieve SoR information when the UE performs Registration with NAS Registration Type "Initial Registration". |

TABLE 2A-continued

| Subscription data type | Field | Description |
|---|---|---|
| | SoR Update Indicator for Emergency Registration | An indication whether the UDM requests the AMF to retrieve SoR information when the UE performs Registration with NAS Registration Type "Emergency Registration". |
| | Network Slicing Subscription Change Indicator | When present, indicates to the serving AMF that the subscription data for network slicing changed and the UE configuration must be updated. |
| | Tracing Requirements | Trace requirements about a UE (e.g, trace reference, address of the Trace Collection Entity, etc.) is defined in TS 32.421 [39]. This information is only sent to AMF in the HPLMN or one of its equivalent PLMN(s). |
| | Inclusion of NSSAI in RRC Connection Establishment Allowed | When present, it is used to indicate that the UE is allowed to include NSSAI in the RRC connection Establishment in clear text for 3GPP access. |
| | Service Gap Time | Used to set the Service Gap timer for Service Gap Control (see clause 5.31.16 of TS 23.501 [2]). |
| | Subscribed DNN list | List of the subscribed DNNs for the UE (NOTE 1). Used to determine the list of LADN available to the UE as defined in clause 5.6.5 of TS 23.501 [2]. |
| | UDM Update Data | Includes a set of parameters see clause 4.20.1 for parameters possible to deliver) to be delivered from UDM to the UE via NAS signalling as defined in clause 4.20 (NOTE 3). Optionally includes an indication that the UDM requests an acknowledgement of the reception of this information from the UE and an indication for the UE to re- register. |
| | NB- IoT UE priority | Numerical value used by the NG- RAN to prioritise between UEs accessing via NB- IoT. |
| | Enhanced Coverage Restriction | Specifies whether CE mode B is restricted for the UE, or both GE mode A and CE mode B are restricted for the UE, or both CE mode A and CE mode B are not restricted for the UE. |
| | NB- IoT Enhanced Coverage Restriction | Indicates whether Enhanced Coverage for NB- IoT UEs is restricted or not. |
| | IAB- Operation allowed | Indicates that the subscriber is allowed for IAB- operation as specified in clause 5.35.2 of TS 23.501 [2]. |
| | Charging Characteristics | It contains the Charging Characteristics as defined in Annex A of TS 32.256 [71]. This information, when provided, shall override any corresponding predefined information at the AMF. |
| | Extended idle mode DRX cycle length | Indicates a subscribed extended idle mode DRX cycle length value. |
| | PCF Selection Assistance info | list of combination of DNN and S- NSSAI that indicates that the same PCF needs to be selected for AM Policy Control and SM Policy Control (NOTE 10). |
| | AerialUESubscriptionInfo | Aerial UE Subscription Information. It contains an Indication on whether Aerial service for the UE is allowed or not. |
| Slice Selection Subscription data (data needed for Slice Selection as described in clause 4.2.2.2.3 and in clause 4.11.0a.5) | Subscribed S- NSSAIs | The Network Slices that the UE subscribes to. In roaming case, it indicates the subscribed network slices applicable to the serving PLMN (NOTE 11). |
| | Default S- NSSAIs | The Subscribed S- NSSAIs marked as default S- NSSAI. In the roaming case, only those applicable to the Serving PLMN (NOTE 12). |
| | S- NSSAIs subject to Network Slice- Specific Authentication and Authorization | The Subscribed S- NSSAIs marked as subject to NSSAA. |
| | Network Slice Simultaneous Registration Group (NSSRG) Information | Optionally, for each S- NSSAI in the Subscribed S- NSSAIs, the one or more value of Network Slice Simultaneous Registration Group(s) (NOTE 11) associated with the S- NSSAI. |

TABLE 2A-continued

| Subscription data type | Field | Description |
|---|---|---|
| SMF Selection Subscription data (data needed for | SUPI | Key<br>SMF Selection Subscription data contains one or more S- NSSAI level subscription data: |
| SMF Selection as described in clause 6.3.2 of TS 23.501 [2]) | S- NSSAI | Indicates the value of the S- NSSAI. |
| | Subscribed DNN list | List of the subscribed DNNs for the UE (NOTE 1). |
| | Default DNN | The default DNN if the UE does not provide a DNN (NOTE 2). |
| | DNN(s) subject to aerial services | List of DNNs that are used for aerial services (e.g. UAS operations or C2, etc.) as described in TS 23.256 [80]. (see NOTE 13). |
| | LBO Roaming Information | Indicates whether LBO roaming is allowed per DNN, or per (S- NSSAI, subscribed DNN), |
| | Interworking with EPS indication list | Indicates whether EPS interworking is supported per (S- NSSAI, subscribed DNN). |
| | Same SMF for Multiple PDU Sessions to the same DNN and S- NSSAI | Indication whether the Same SMF for multiple PDU Sessions to the same DNN and S- NSSAI is required. |
| | Invoke NEF indication | When present, indicates, per S- NSSAI and per DNN, that NEF based infrequent small data transfer shall be used for the PDU Session (see NOTE 8). |
| | SMF information for static IP address/prefix | When static IP address/prefix is used, this may be used to indicate the associated SMF information per (S- NSSAI, DNN). |
| UE context in SMF data | SUPI | Key. |
| | PDU Session Id(s) | List of PDU Session Id(s) for the UE.<br>For emergency PDU Session Id: |
| | Emergency Information | The SMF + PGW- C FQDN for emergency session used for interworking with EPC.<br>For each non- emergency PDU Session Id: |
| | DNN | DNN for the PDU Session. |
| | SMF | Allocated SMF for the PDU Session. Includes SMF IP Address and SMF NF Id. |
| | SMF + PGW- C FQDN | The S5/S8 SMF + PGW-C FQDN used for interworking with EPS (see NOTE 5). |
| | PCF ID | The PCF ID serving the PDU Session/PDN Connection. |
| SMS Management Subscription data (data needed by SMSF for SMSF Registration) | SMS parameters | Indicates SMS parameters subscribed for SMS service such as SMS teleservice, SMS barring list |
| | Trace Requirements | Trace requirements about a UE (e.g. trace reference, address of the Trace Collection Entity, etc.) is defined in TS 32.421 [39]. This information is only sent to a SMSF in HPLMN. |
| SMS Subscription data (data needed in AMF) | SMS Subscription | Indicates subscription to any SMS delivery service over NAS irrespective of access type. |
| UE Context in SMSF data | SMSF Information | Indicates SMSF allocated for the UE, including SMSF address and SMSF NF ID. |
| | Access Type | 3GPP or non- 3GPP access through this SMSF |
| Session Management Subscription data (data needed for PDU Session Establishment) | GPSI List | List of the GPSI (Generic Public Subscription Identifier) used both inside and outside of the 3GPP system to address a 3GPP subscription. |
| | Internal Group ID- list | List of the subscribed infernal group(s) that the UE belongs to. |
| | Trace Requirements | Trace requirements about a UE (e.g. trace reference, address of the Trace Collection Entity, etc . . .) is defined in TS 32.421 [39]. This information is only sent to a SMF in the HPLMN or one of its equivalent PLMN(s). |

TABLE 2A-continued

| Subscription data type | Field | Description |
|---|---|---|
| | Session Management Subscription data contains one or more S-NSSAI level subscription data: | |
| | S-NSSAI | Indicates the value of the S-NSSAI. |
| | Subscribed DNN list | List of the subscribed DNNs for the S-NSSAI (NOTE 1). |
| | For each DNN in S-NSSAI level subscription data: | |
| | DNN | DNN for the PDU Session. |
| | Aerial service indication | Indicates whether the DNN is used for aerial services (e.g. UAS operations or C2, etc.) as described in TS 23.256 [80]. |
| | Framed Route information | Set of Framed Routes. A Framed Route refers to a range of IPv4 addresses/IPv6 Prefixes to associate with a PDU Session established on this (DNN, S-NSSAI). See NOTE 4. |
| | IP Index information | Information used for selecting how the UE IP address is to be allocated (see clause 5.8.2.2.1 in TS 23.501 [2]). |
| | Allowed PDU Session Types | Indicates the allowed PDU Session Types (IPv4, IPv6, IPv4v6, Ethernet, and Unstructured) for the DNN, S-NSSAI. See NOTE 6. |
| | Default PDU Session Type | Indicates the default PDU Session Type for the DNN, S-NSSAI. |
| | Allowed SSC modes | Indicates the allowed SSC modes for the DNN, S-NSSAI. |
| | Default SSC mode | Indicate the default SSC mode for the DNN, S-NSSAI. |
| | Interworking with EPS indication | Indicates whether Interworking with EPS is supported for this DNN and S-NSSAI. |
| | 5GS Subscribed QoS profile | The QoS Flow level QoS parameter values (5QI and ARP) for the DNN, S-NSSAI (see clause 5.7.2.7 of TS 23.501 [2]). |
| | Charging Characteristics | It contains Charging Characteristics as defined in Annex A clause A.1 of TS 32.255 [45]. This information, when provided, shall override any corresponding predefined information at the SMF. |
| | Subscribed-Session-AMBR | The maximum aggregated uplink and downlink MBRs to be shared across all Non-GBR QoS Flows in each PDU Session, which are established for the DNN, S-NSSAI. |
| | Static IP address/prefix | Indicate the static IP address/prefix for the DNN, S-NSSAI. |
| | User Plane Security Policy | Indicates the security policy for integrity protection and encryption for the user plane. |
| | PDU Session continuity at inter RAT mobility | Provides for this DDN, S-NSSAI how to handle a PDU Session when UE the moves to or from NB-IoT. Possible values are: maintain the PDU session; disconnect the PDU session with a reactivation request; disconnect PDU session without reactivation request; or to leave it to local VPLMN policy. |
| | NEF Identity for NIDD | When present, indicates, per S-NSSAI and per DNN, the identity of the NEF to anchor Unstructured PDU Session. When not present for the S-NSSAI and DNN, the PDU session terminates in UPF (see NOTE 8). |
| | NIDD information | Information such as External Group Identifier, External Identifier, MSISDN, or AF Identifier used for SMF-NEF Connection. |
| | SMF-Associated Expected UE Behaviour parameters | Parameters on expected characteristics of a PDU Session their corresponding validity times as specified in clause 4.15.6.3. |
| | Suggested number of downlink packets | Parameters on expected PDU session characteristics as specified in clauses 4.15.3.2.3b and 4.15.6.3a. |
| | ATSSS information | Indicates whether MA PDU session establishment is allowed. |

TABLE 2A-continued

| Subscription data type | Field | Description |
|---|---|---|
| | Secondary authentication indication | Indicates that whether the Secondary authentication/authorization (as defined in clause 5.6 of TS 23.501 [2]) is required for PDU Session Establishment as specified in clause 4.3.2.3. (see NOTE 14) |
| | DN-AAA server UE IP address allocation indication | Indicates that whether the SMF is required to request the UE IP address from the DN-AAA server (as defined in clause 5.6 of TS 23.501 [2]) for PDU Session Establishment as specified in clause 4.3.2.3. |
| | DN-AAA server addressing information | If at least one of secondary DN-AAA authentication, DN-AAA authorization or DN-AAA UE IP address allocation is required by subscription data, the subscription data may also contain DN-AAA server addressing Information. |
| | Edge Configuration Server Address Configuration Information | Consists of one or more FQDN(s) and/or IP Address(es) of Edge Configuration Server(s) as defined in clause 6.5.2 of TS 23.548 [74]. |
| | API based secondary authentication indication | Indicates that whether the API based Secondary authentication/authorization (as defined in clause 5.2.3 of TS 23.256 [80]) is required for PDU Session Establishment as specified in clause 4.3.2.3. (see NOTE 14). |
| Identifier translation | SUPI | Corresponding SUPI for input GPSI. |
| | (Optional) MSISDN | Corresponding GPSI (MSISDN) for input GPSI (External Identifier). This is optionally provided for legacy SMS infrastructure not Supporting MSISDN-less SMS. The presence of an MSISDN should be interpreted as an indication to the NEF that MSISDN shall be used to identify the UE when sending the SMS to the SMS-SC via T4. |
| | GPSI | Corresponding GPSI for input SUPI and Application Port ID. |
| Intersystem continuity Context | (DNN, PGW FQDN) list | For each DNN, indicates the SMF + PGW-C which support interworking with EPC. |
| LCS privacy (data needed by GMLC) | LCS privacy profile data | Provides information for LCS privacy classes and Location Privacy Indication (LPI) as defined in clause 5.4.2 in TS 23.273 [51] |
| LCS mobile origination (data needed by AMF) | LCS Mobile Originated Data | When present, indicates to the serving AMF which LCS mobile originated services are subscribed as defined in clause 7.1 in TS 23.273 [51]. |
| User consent (see TS 23.288 [50]) | User consent for UE data collection | Indicates whether the user has given consent for collecting, distributing, and analysing UE related data. User consent is provided per purpose (e.g. analytics, model training). |
| UE reachability | UE reachability information | Provides, per PLMN, the list of NF IDs or the list of NF sets or the list of NF types authorized to request notification for UE's reachability (NOTE 7). |
| V2X Subscription data (see TS 23.287 [73]) | NR V2X Services Authorization | Indicates whether the UE is authorized to use the NR sidelink for V2X services as Vehicle UE, Pedestrian UE, or both. |
| | LTE V2X Services Authorization | Indicates whether the UE is authorized to use the LTE sidelink for V2X services as Vehicle UE, Pedestrian UE, or both. |
| | NR UE-PC5-AMBR | AMBR of UE's NR sidelink (i.e. PC5) communication for V2X services. |
| | LTE UE-PC5-AMBR | AMBR of UE's LTE sidelink (i.e. PC5) communication for V2X services. |
| ProSe Subscription data (see TS 23.304 [77]) | ProSe Service Authorization | Indicates whether the UE is authorized to use ProSe Direct Discovery, ProSe Direct Communication, or both and whether the UE is authorized to use or serve as a ProSe UE-to-Network Relay. |
| | ProSe NR UE-PC5-AMBR | AMBR of UE's NR sidelink. (i.e. PC5) communication for ProSe services. |

TABLE 2A-continued

| Subscription data type | Field | Description |
| --- | --- | --- |
| MBS Subscription data (see TS 23.247 [78]) | MBS Service Authorization | Indicates whether the UE is authorized to use Multicast MBS service. |
| Aerial Subscription data | Aerial Service Authorization (or Aerial subscription information) | Indicates whether the UE is authorized (or allowed) to use Aerial service. |

(NOTE 1):
The Subscribed DNN list can include a wildcard DNN.
(NOTE 2):
The default DNN shall not be a wildcard DNN.
(NOTE 3):
The Steering of Roaming information and UDM Update Data are protected using the mechanisms defined in TS 33.501 [15].
(NOTE 4):
Framed Route information and Framed Route(s) are defined in TS 23.501 [2].
(NOTE 5):
Depending on the scenario PGW- C FQDN may be for S5/S8, or for S2b (ePDG case).
(NOTE 6):
The Allowed PDU Session Types configured for a DNN which supports interworking with EPC should contain only the PDU Session Type corresponding to the PDN Type configured in the APN that corresponds to the DNN.
(NOTE 7):
Providing a list of NF types or a list of NF sets may be more appropriate for some deployments, e.g. in highly dynamic NF lifecycle management deployments.
(NOTE 8):
For a S- NSSAI and a DNN, the "Invoke NEF Indication" shall be present in the SMF selection subscription data if and only if the "NEF Identity for NIDD" Session Management Subscription Data includes a NEF Identity. When the "NEF Identity for NIDD" Session Management Subscription Data includes a NEF Identity for a S- NSSAI and DNN, the "Control Plane Only Indicator" will always be set for PDU Sessions to this S- NSSAI and DNN (see clause 5.31.4.1 of TS 23.501 [2]).
(NOTE 9):
When multiple GPSIs are included in the GPSI list, any GPSI in the list can be used in NSSAA procedures.
(NOTE 10):
The same PCF can be selected to serve the UE and to serve one or multiple PDU sessions, each of them is indicated in the list of S- NSSAI, DNN combinations in the PCF Selection Assistance Info. Providing one combination of DNN and S- NSSAI in the PCF Selection Assistance Info is assumed if interworking with EPS is needed. In case multiple PDU sessions to one DNN, S- NSSAI are established in EPS, it is appropriate to select same PCF by configuration or by using existing method, e.g. same PCF selection in usage monitoring.
(NOTE 11):
If Network Slice Simultaneous Registration Group information is present, and the VPLMN does not support the subscription- based restrictions to simultaneous registration of network slices, the subset of the Subscribed S- NSSAIs defined in clause 5.15.12 of TS 23.501 [2], are included, without providing the NSSRG information.
(NOTE 12):
The Default S- NSSAIs (if more than one is present) are associated with common NSSRG values if NSSRG information is present. At least one Default S- NSSAI shall be present in a subscription including NSSRG information.
(NOTE 13):
When UUAA is performed in the AMF (as in clause 5.2.2 of TS 23.256 [80]) and UUAA- MM status is FAILED or PENDING, the AMF shall reject PDU session establishment requests from the UE for a DNN that is subject to aerial services.
(NOTE 14):
For a DNN in S- NSSAI either a DN- AAA based secondary authentication, or an API based secondary authentication can be configured. When API based authentication of the PDU session is required, Secondary authentication indication shall not be present.

TABLE 3

UE Subscription data types keys

| Subscription Data Types | Data Key | Data Sub Key |
| --- | --- | --- |
| Access and Mobility Subscription data | SUPI | Serving PLMN ID and optionally NID |
| SMF Selection Subscription data | SUPI | Serving PLMN ID and optionally NID |
| UE context in SMF data | SUPI | S- NSSAI |
| SMS Management Subscription data | SUPI | Serving PLMN ID and optionally NID |
| SMS Subscription data | SUPI | Serving PLMN ID and optionally NID |
| UE Context in SMSF data | SUPI | — |
| Session Management Subscription data | SUPI | S- NSSAI DNN Serving PLMN ID and optionally NID |
| Identifier translation | GPSI | — |
|  | SUPI | Application Port ID |
| Slice Selection Subscription data | SUPI | Serving PLMN ID and optionally NID |
| Intersystem continuity Context | SUPI | DNN |
| LCS privacy | SUPI | — |
| LCS mobile origination | SUPI | — |
| User consent | SUPI | Purpose |
| UE reachability | SUPI | — |
| V2X Subscription data | SUPI | — |
| ProSe Subscription data | SUPI | — |
| MBS Subscription data | SUPI | — |
| Aerial Subscription data | SUPI | — |

Operation 206a: The UDM, recognizing a change in the aerial subscription information about the UAV UE in operation 205, may notify the NEF, which requested subscription in operation 202, of the same. The UDM may transmit an Nudm_EventExposure_Notify message. The UDM may provide the NEF with an Nudm_EventExposure_Notify message including the SUPI and/or GPSI, and the change in the aerial subscription identified in operation 205. Further, the Nudm_EventExposure_Notify message may further include the time stamp for providing a notification of the occurrence of a change event of aerial subscription information.

Operation 206b: If the UDM provided the notification of the event occurrence along with the time information (time stamp) in operation 206a, the NEF may request the UDR to store the time information and the event occurrence information. The NEF may transmit an Nudr_DM_Create or Nudr_DM_Update message including the event occurrence information and time information to the UDR.

Operation 207: Upon receiving the notification of the change event occurrence of the aerial subscription information from the UDM in operation 206a, the NEF may notify the US S having requested subscription in operation 201 of the occurrence of the change event. The NEF may send an Nnef_EventExposure_Notify message to the USS. The NEF may provide the USS with an Nnef_EventExposure_Notify message including the GPSI, the CAA-Level UAV ID, and the change in the aerial subscription information of operation 206a.

Operation 208: The NEF, receiving the notification of the occurrence of the change event of the aerial subscription information from the UDM in operation 206a, may determine whether the UUAA result for the UAV UE of operation 200 is revoked. For example, when the aerial subscription information about the UAV UE is changed from 'allowed' to 'not allowed,' the NEF may determine that the UUAA result for the UAV UE is revoked. Upon determining that the UUAA result for the UAV UE is revoked, the target NF having performed the UUAA procedure may be identified in the UUAA context of the UAV UE stored in operation 200. For example, the AMF ID of the AMF when the UUAA-MM procedure is performed and the SMF ID of the SMF when the UUAA-SM procedure is performed may be information indicating the target NF. When the NEF is unable to know the AMF ID where the UUAA-MM procedure has been performed, the NEF may provide a GPSI to the UDM and receive the corresponding AMF ID (in this case, an Nudm_UECM_Get Request/Response message may be used).

Operation 209a: When the target is identified as the AMF in operation 208, the NEF may notify the AMF that the UUAA result of the UAV UE is revoked. The NEF may transmit an Nnef_Auth_Notification message to the AMF. The NEF may provide the AMF with an Nnef_Auth_Notification message including the SUPI and/or GPSI and the cause of revocation. The cause of revocation may include 'aerial subscription is not allowed' or 'removal of aerial subscription'.

Operation 209b: When the target is identified as the SMF in operation 208, the NEF may notify the SMF that the UUAA result of the UAV UE is revoked. The NEF may transmit an Nnef_Auth_Notification message to the SMF. The NEF may provide the SMF with an Nnef_Auth_Notification message including the SUPI and/or GPSI, PDU session IP address, and the cause of revocation. The cause of revocation may include 'aerial subscription is not allowed' or 'removal of aerial subscription'.

Operation 209a or operation 209b may be selectively performed depending on whether the target NF is an AMF or an SMF.

Operation 210a: When the NEF requested the AMF to subscribe to the reachability event of the UAV UE in the UUAA procedure before operation 200, the NEF may request to unsubscribe the corresponding subscription request. The NEF may have requested the AMF to subscribe to the mobility event exposure in which the value of the event ID is indicated as reachability filter. The NEF and the AMF may have used the Namf_EventExposure_Subscribe Request and response message, and the NEF may provide the subscription correlation ID allocated at that time to the AMF to request to unsubscribe the subscription request for the reachability event. Upon requesting to unsubscribe, the NEF may use the Namf_EventExposure_Unsubscribe Request message. The UE reachability event may be defined as UE Reachability in Table 1 above.

Operation 210b: The AMF, receiving a request for unsubscribing the subscription request for the reachability event of the UAV UE in operation 210a, may transmit an acknowledgment for reception of the request to the NEF. Upon responding with the acknowledgment, the AMF may use the Namf_EventExposure_Unsubscribe Response message.

Operation 211: When the UAV UE is in idle state, the target NF (AMF or SMF) determined based on the AMF ID or SMF ID in operation 208 may perform a network trigger service request procedure.

Operation 212a: Upon determining that the UUAA-MM procedure was performed in operation 208, the AMF may notify the UE that the UUAA result is revoked based on the network policy. The AMF may perform a UE configuration update procedure to notify the UE of the revocation of the UUAA result. Further, the AMF may initiate a procedure for releasing the PDU session(s) for the relevant UAS service (s).

Operation 212b: Upon determining that the UUAA-MM procedure was performed in operation 208, the AMF may initiate a de-registration procedure based on the network policy.

Operation 212c: Upon determining that the UUAA-SM procedure was performed in operation 208, the SMF may initiate a procedure for releasing the related PDU session(s).

Operation 213a: When the NEF requested the SMF to subscribe to a certain event in the UUAA procedure before operation 200, the NEF may request to unsubscribe the corresponding subscription request. The NEF may have requested the SMF to subscribe to the PDU session status event of Table 1 above. The NEF and the SMF may have used the Nsmf_EventExposure_Subscribe Request and response message upon requesting to subscribe to the PDU session status event and responding, and the NEF may provide the subscription correlation ID allocated at that time to the SMF to request to unsubscribe the subscription request for the PDU session status event. Upon unsubscription request, the NEF may use the Nsmf_EventExposure_ Unsubscribe Request message.

Operation 213b: The SMF, receiving a request for unsubscribing the subscription request for the event in operation 213a, may transmit an acknowledgment for reception of the request to the NEF. Upon responding with the acknowledgment, the SMF may use the Nsmf_EventExposure_Unsubscribe Response message.

Figure 3A:
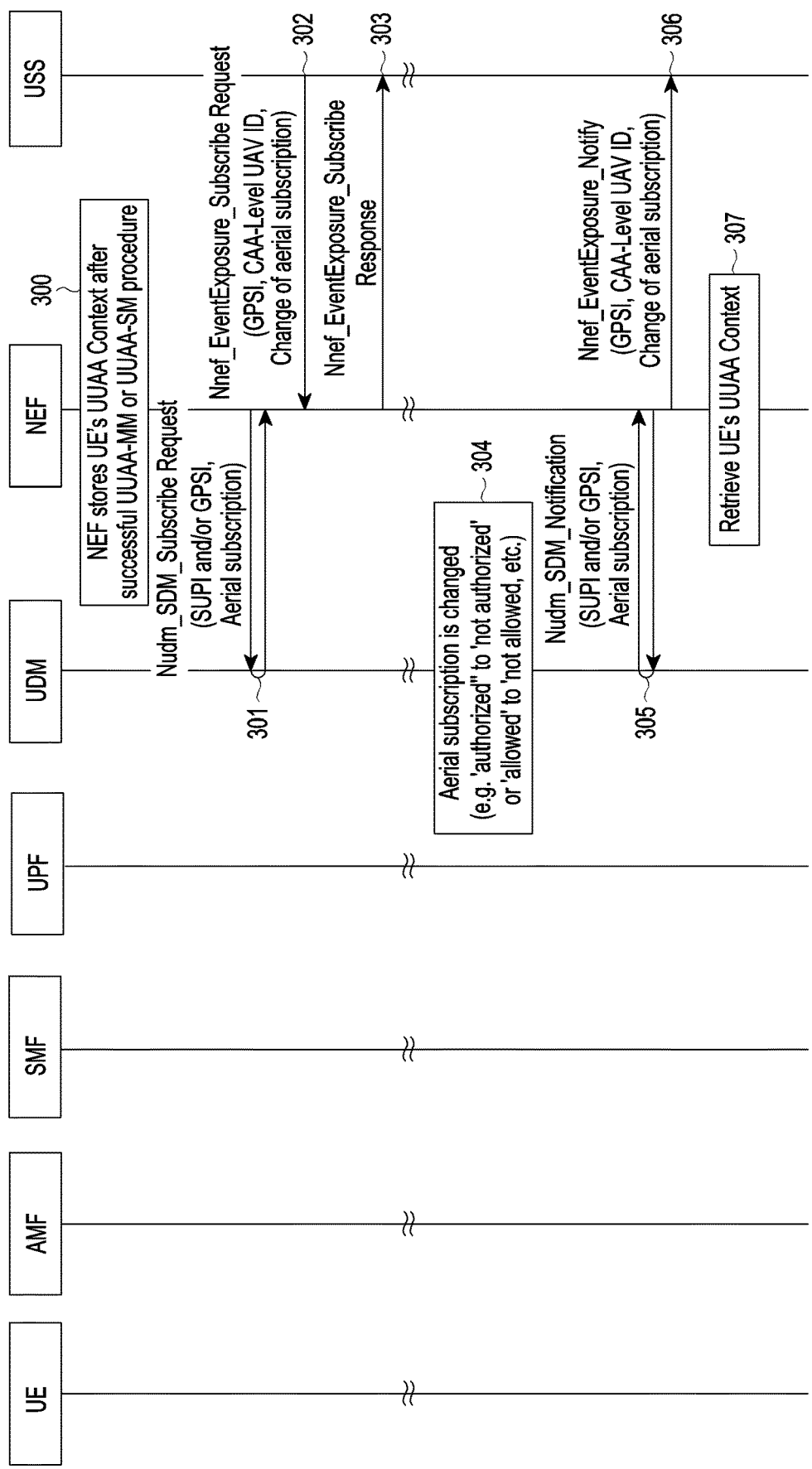
FIGS. 3A and 3B are views illustrating a UUAA revocation procedure to notify of a change in aerial subscription information using a subscription data management (SDM) service of a UDM in a wireless communication system according to various embodiments of the disclosure.
Figure 3B:
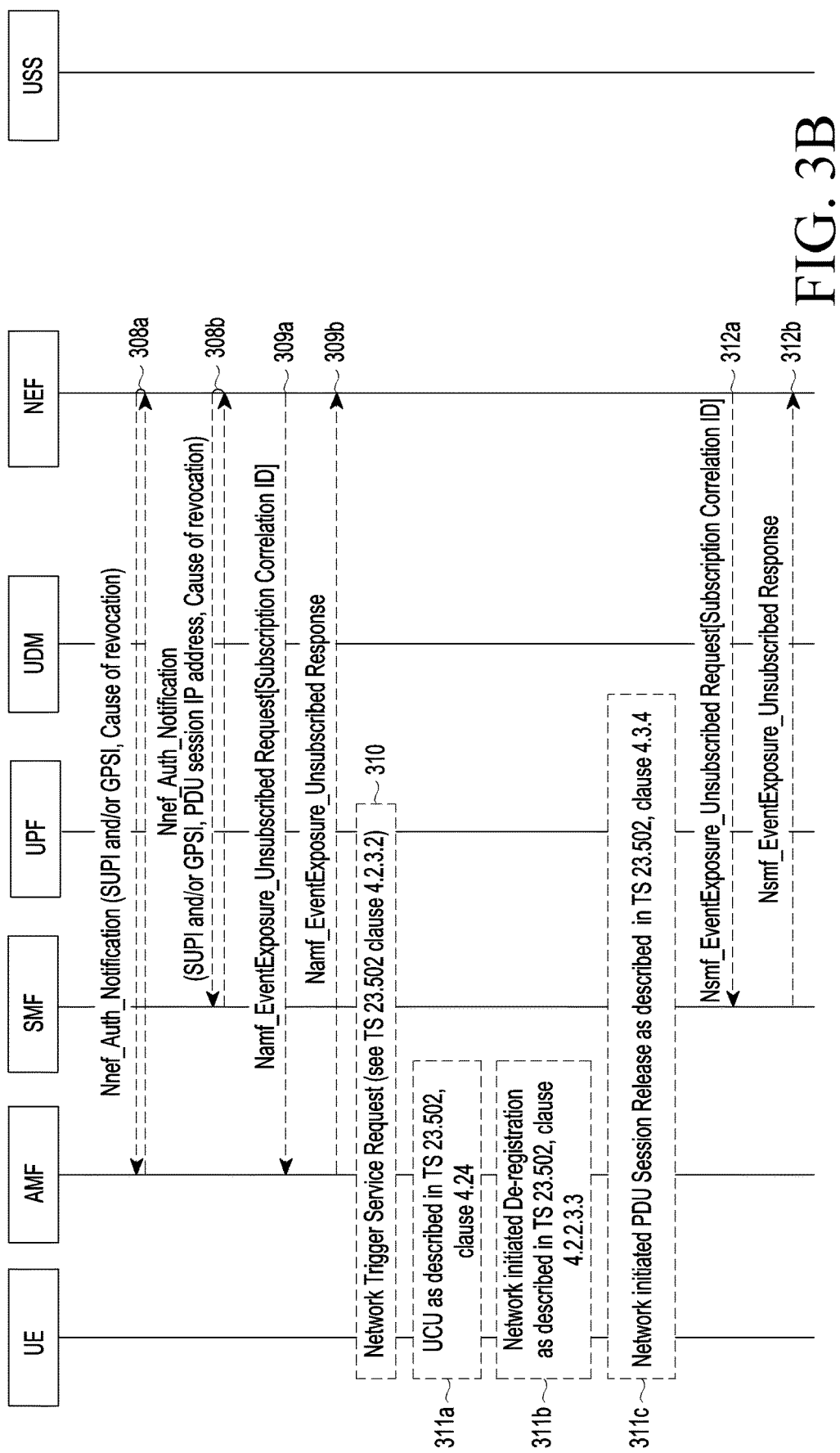

FIGS. 3A and 3B illustrate a UUAA revocation procedure to notify of a change in aerial subscription information using a subscription data management (SDM) service of a UDM in a wireless communication system according to various embodiments of the disclosure.

Referring to FIGS. 3A and 3B, Operation 300: Operation 300 is the same as operation 200 of FIG. 2A. When a UUAA procedure which is a procedure for authentication and authorization to allow the UAV UE to communicate with the USS through the wireless communication system succeeds, the NEF may store the UUAA context of the UAV UE.

Operation 301: The NEF may send a subscription request to the UDM to notify of an occurrence of a change in the aerial subscription information about the UAV UE of operation 300. The NEF may send an Nudm_SDM_Subscribe Request message to the UDM. The NEF may provide the UDM with an Nudm_SDM_Subscribe Request message including the SUPI and/or GPSI and the information indicating that the subscription request target is aerial subscription information.

Operation 302: Operation 302 is the same as operation 201 of FIG. 2A. The USS may transmit a subscription request to the NEF to notify of an occurrence of a change in the aerial subscription information about the UAV UE of operation 300.

Operation 303: Upon receiving the request of operation 302, the NEF may transmit a result of the request to the USS. For example, when the NEF accepts the request of the USS, the NEF may provide the USS with an Nnef_EventExposure_Subscription Response message including the identifier (Subscription Correlation ID) for the USS request of operation 302 and/or the expiry time according to the policy of the communication carrier.

Operation 304: Operation 304 is the same as operation 205 of FIG. 2A. The UDM accepting the subscription request of operation 201 may recognize the occurrence of the change in the aerial subscription information about the UAV UE based on the subscription information about the UE as in the example of Table 2 managed by the UDM.

Operation 305: The UDM, recognizing a change in the aerial subscription information about the UAV UE in operation 304, may notify the NEF, which requested subscription in operation 301, of the same. The UDM may transmit an Nudm_SDM_Notification message. The UDM may provide the NEF with an Nudm_SDM_Notification message including the SUPI and/or GPSI, and the change in the aerial subscription identified in operation 304.

Operation 306: The NEF, receiving the changed aerial subscription information from the UDM in operation 305, may notify the USS, which requested subscription in operation 302, of the same. The NEF may transmit an Nnef_EventExposure_Notify message. The NEF may provide the USS with a Nnef_EventExposure_Notify message including the GPSI, the CAA-Level UAV ID, and the change in the aerial subscription information received in operation 305.

Operations 307 to 312b: Operations 307 to 312b are the same as operations 208 to 213b of FIGS. 2A and 2B. In other words, the NEF, receiving the notification of the occurrence of a change in the aerial subscription information, may determine whether the UUAA result for the UAV UE is revoked and, if revoked, notifies the target NF (AMF or SMF) of the revocation of the UUAA result. The target NF (AMF or SMF) may process the subscription request unsubscription for the reachability event of the UAV UE. The AMF may notify the UAV UE of the revocation of the UUAA result and perform a de-registration procedure, and the SMF may perform a procedure for releasing the PDU session(s).

Figure 4A:
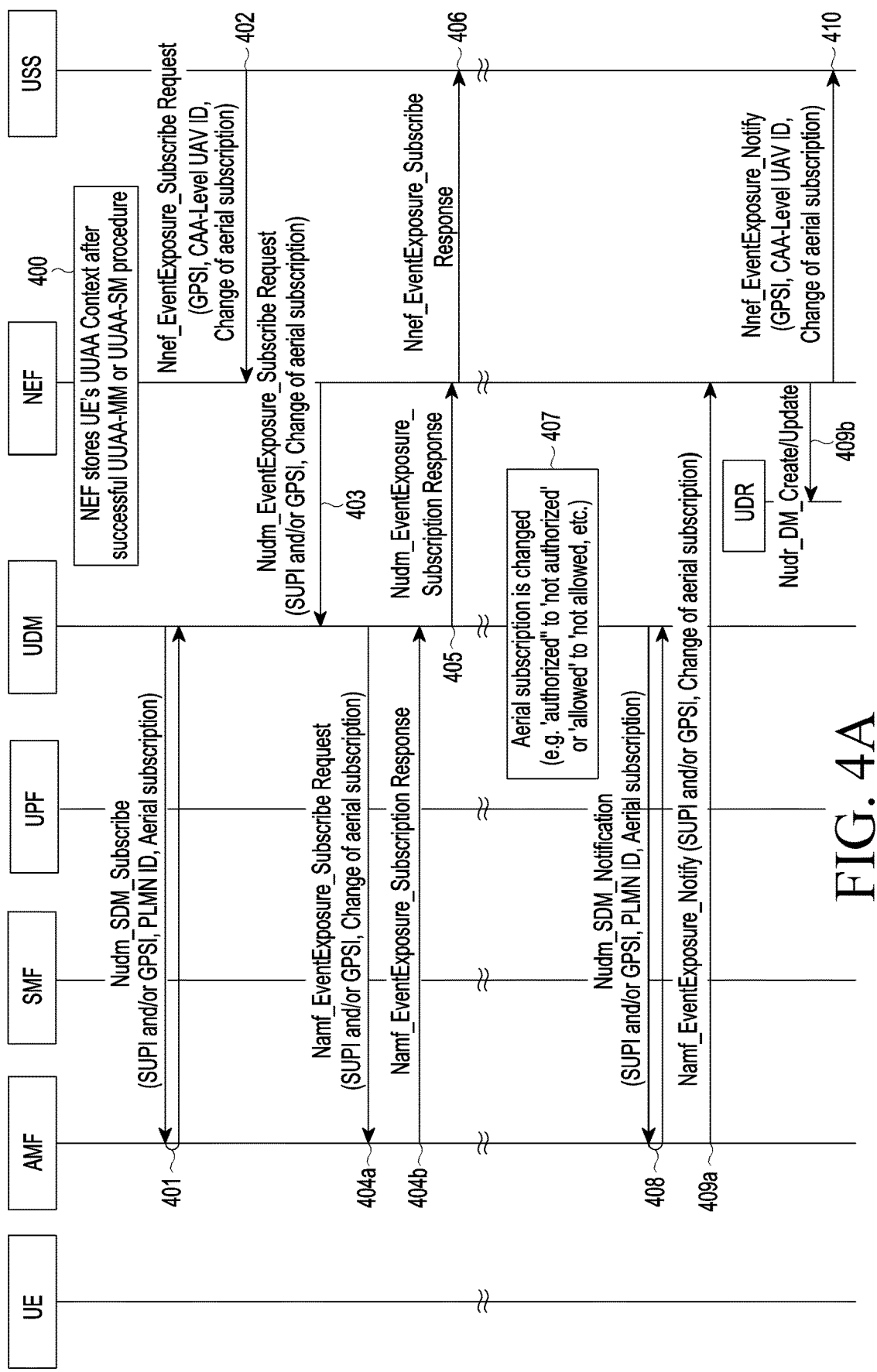
FIGS. 4A and 4B are views illustrating a UUAA revocation procedure to notify of a change in aerial subscription information using an event exposure service and SDM service of a UDM and an AMF in a wireless communication system according to various embodiments of the disclosure.
Figure 4B:
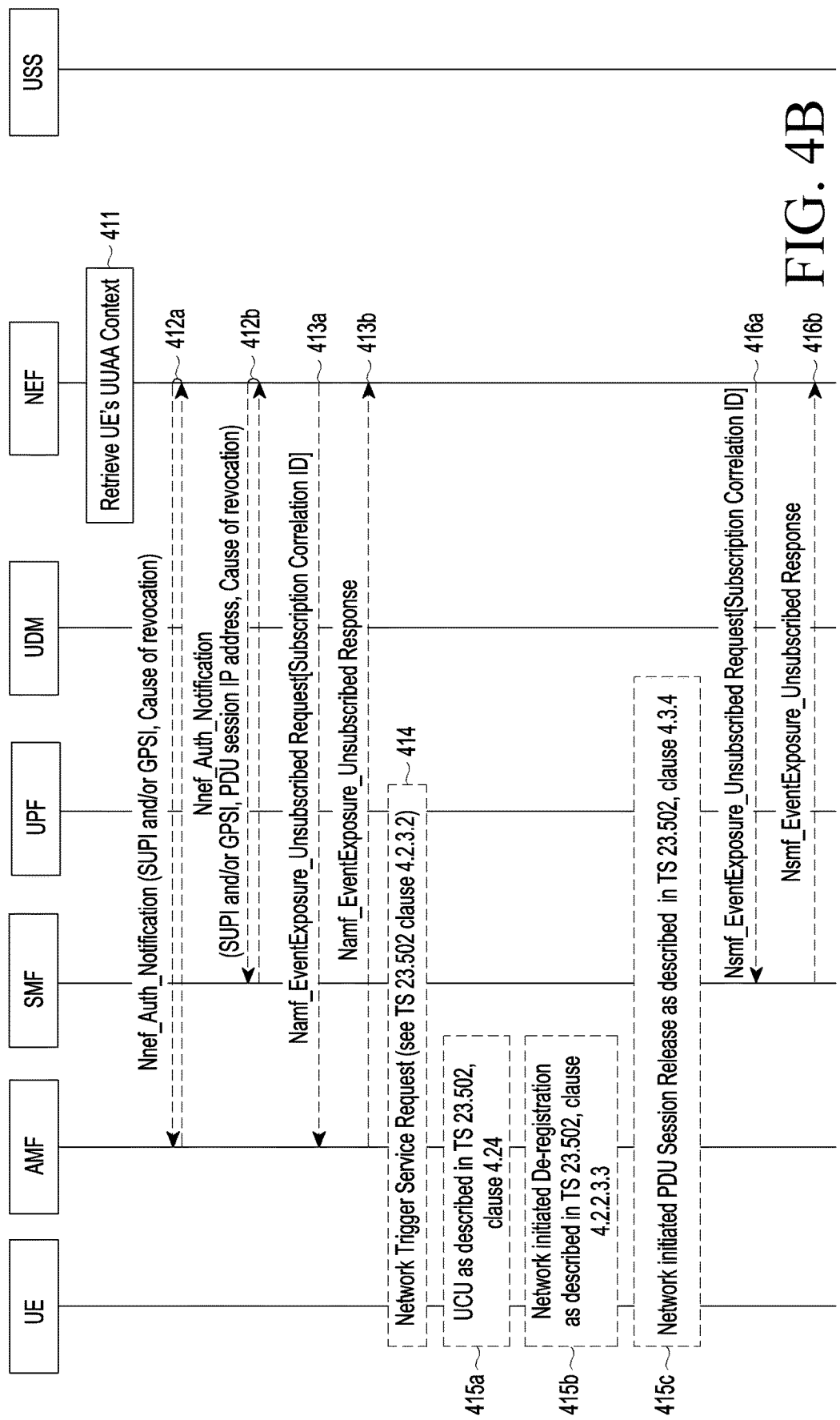

FIGS. 4A and 4B illustrate a UUAA revocation procedure to notify of a change in aerial subscription information using an event exposure service and SDM service of a UDM and an AMF in a wireless communication system according to various embodiments of the disclosure.

Referring to FIGS. 4A and 4B, Operation 400: Operation 400 is the same as operation 200 of FIG. 2A. When a UUAA procedure which is a procedure for authentication and authorization to allow the UAV UE to communicate with the USS through the wireless communication system succeeds, the NEF may store the UUAA context of the UAV UE.

Operation 401: The AMF may send a subscription request to the UDM to notify of an occurrence of a change in the aerial subscription information about the UAV UE of operation 400. The AMF may transmit an Nudm_SDM_Subscribe Request message to the UDM. The AMF may provide the UDM with an Nudm_SDM_Subscribe Request message including the SUPI and/or GPSI, PLMN ID, and the information indicating that the subscription request target is aerial subscription information included in the "Access and Mobility Subscription data" of Table 2 above. For example, the aerial subscription information may correspond to "AerialUESubscriptionInfo" of Table 2 above.

Operation 402: Operation 402 is the same as operation 201 of FIG. 2A. The USS may transmit a subscription request to the NEF to notify of an occurrence of a change in the aerial subscription information about the UAV UE of operation 400.

Operation 403: Operation 403 is the same as operation 202 of FIG. 2A. Upon receiving the request of operation 402, the NEF may request the UDM to subscribe to the aerial subscription information change event.

Operation 404a: Upon trying to provide the NEF with the event for the change in the aerial subscription information (i.e., "AerialUESubscriptionInfo") included in "Access and Mobility Subscription data" in Table 2 above, the UDM receiving the request of operation 403 may request the AMF of operation 401 to subscribe to that end. The UDM may transmit an Namf_EventExposure_Subscribe Request message. The UDM may provide the AMF with an Namf_EventExposure_Subscribe Request message including the NEF identifier (endpoint of NEF) and the event that may be detected by the UDM according to the change in the aerial subscription information ("AerialUESubscriptionInfo") in the "Access and Mobility Subscription data" in Table 2 above, the SUPI and/or GPSI.

Operation 404b: Upon receiving the request of operation 404a, the AMF may transmit a result of the request to the UDM. For example, when the AMF accepts the UDM request, the UDM may provide the UDM with an Namf_EventExposure_Subscription Response message including the identifier (Subscription Correlation ID) for the UDM request of operation 404a and/or the expiry time according to the policy of the communication carrier.

Operation 405: Upon receiving the result of operation 404b, the UDM may transmit the result of the request of the NEF of operation 403 to the NEF. For example, when the AMF accepts the request of the UDM in operation 404b and the UDM accepts the request of the NEF, an Nudm_EventExposure_Subscription Response message including the identifier (subscription correlation ID) for the request of the NEF in operation 403 and/or expiry time according to the policy of the communication carrier may be provided to the NEF.

Operation 406: Upon receiving the result of operation 405, the NEF may transmit the result of the request of the USS of operation 402 to the USS. For example, when the UDM accepts the request of the NEF in operation 405 and the NEF accepts the request of the USS, an Nnef_EventExposure_Subscription Response message including the identifier (subscription correlation ID) for the request of the USS in operation 402 and/or expiry time according to the policy of the communication carrier may be provided to the USS.

Operation 407: The UDM, accepting the subscription request of operation 401, may recognize the occurrence of a change in the aerial subscription information ("AerialUESubscriptionInfo") of the "Access and Mobility Subscription data" in Table 2 of the UAV UE. For example, it may correspond to when the value of "AerialUESubscriptionInfo" is changed from 'authorized' to 'not authorized' or from 'allowed' to 'not allowed'. The data key for accessing the "aerial subscription of Access and Mobility Subscription data" information by the UDM may include the SUPI and serving PLMN ID exemplified in Table 3 above.

Operation 408: The UDM, recognizing a change in the aerial subscription information ("AerialUESubscriptionInfo") of the "Access and Mobility Subscription data" of the UAV UE in operation 407, may notify the AMF, which requested subscription in operation 401, of the same. The UDM may transmit an Nudm_SDM_Notification message. The UDM may provide the AMF with the SUPI and/or GPSI, PLMN ID, and the changed aerial subscription information of the "Access and Mobility Subscription data" in operation 407.

Operation 409*a*: The AMF, receiving the changed aerial subscription information from the UDM in operation 408, may provide the changed aerial subscription information to the NEF having made the subscription request of operation 403, using the NEF indicator provided by the UDM in the subscription request of operation 404*a*. The AMF may transmit an Namf_EventExposure_Notify message to the NEF. The AMF may provide the NEF with the change in the aerial subscription information based on the changed aerial subscription information received in operation 408, and the SUPI and/or GPSI.

Operation 409*b*: If the AMF provided the notification of the event occurrence along with the time information (time stamp) in operation 409*a*, the NEF may request the UDR to store the time information and the event occurrence information. The NEF may transmit an Nudr_DM_Create or Nudr_DM_Update message including the event occurrence information and time information to the UDR.

Operation 410: Upon receiving the notification of the change event occurrence of the aerial subscription information from the AMF in operation 409*a*, the NEF may notify the USS having requested subscription in operation 402 of the occurrence of the change event. The NEF may transmit an Nnef_EventExposure_Notify message. The NEF may provide the USS with a Nnef_EventExposure_Notify message including the GPSI, the CAA-Level UAV ID, and the change in the aerial subscription information of operation 409*a*.

Operations 411 to 416*b*: Operations 411 to 416*b* are the same as operations 208 to 213*b* of FIGS. 2A and 2B. In other words, the NEF, receiving the notification of the occurrence of a change in the aerial subscription information, may determine whether the UUAA result for the UAV UE is revoked and, if revoked, notifies the target NF (AMF or SMF) of the revocation of the UUAA result. The target NF (AMF or SMF) may process the subscription request unsubscription for the reachability event of the UAV UE. The AMF may notify the UAV UE of the revocation of the UUAA result and perform a de-registration procedure, and the SMF may perform a procedure for releasing the PDU session(s).

Figure 5A:
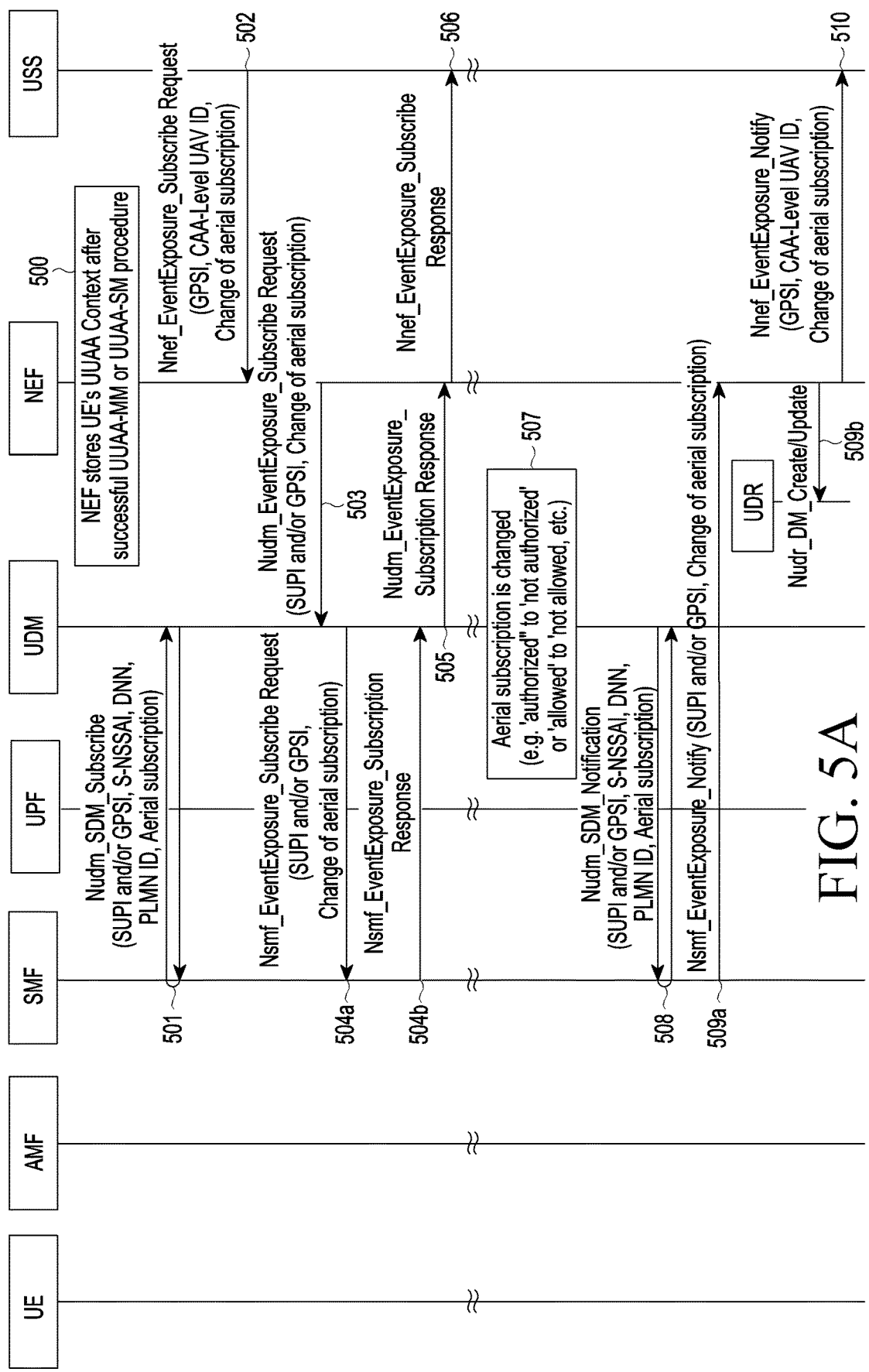
FIGS. 5A and 5B are views illustrating a UUAA revocation procedure to notify of a change in aerial subscription information using an event exposure service and SDM service of a UDM and an SMF in a wireless communication system according to various embodiments of the disclosure.
Figure 5B:
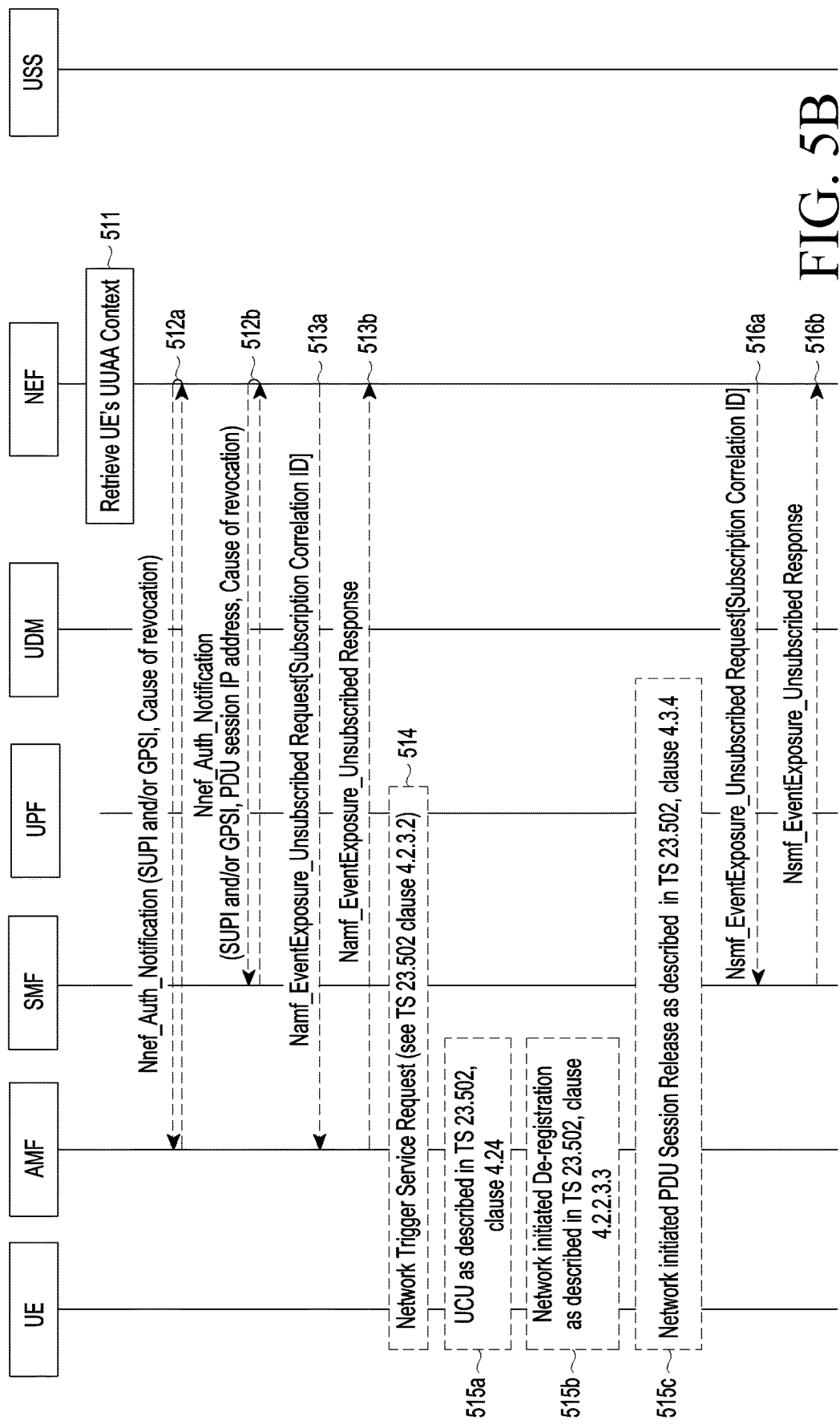

FIGS. 5A and 5B illustrate a UUAA revocation procedure to notify of a change in aerial subscription information using an event exposure service and SDM service of a UDM and an SMF in a wireless communication system according to various embodiments of the disclosure.

Referring to FIGS. 5A and 5B, Operation 500: Operation 500 is the same as operation 200 of FIG. 2A. When a UUAA procedure which is a procedure for authentication and authorization to allow the UAV UE to communicate with the USS through the wireless communication system succeeds, the NEF may store the UUAA context of the UAV UE.

Operation 501: The SMF may send a subscription request to the UDM to notify of an occurrence of a change in the aerial subscription information about the UAV UE of operation 500. The SMF may transmit an Nudm_SDM_Subscribe Request message to the UDM. The SMF may provide the UDM with the SUPI and/or GPSI, single-network slice selection assistance information (S-NSSAI), data network name (DNN), public land mobile network (PLMN) ID, and information indicating that the subscription request target is the aerial subscription information included in the "Session Management Subscription data" of Table 2 above. The S-NSSAI is an identifier for identifying the network slice, and the DNN may be used to select the SMF and the UPF. For example, the aerial subscription information may correspond to "Aerial service indication" of Table 2 above.

Operation 502: Operation 502 is the same as operation 201 of FIG. 2A. The USS may transmit a subscription request to the NEF to notify of an occurrence of a change in the aerial subscription information about the UAV UE of operation 500.

Operation 503: Operation 503 is the same as operation 202 of FIG. 2A. Upon receiving the request of operation 502, the NEF may request the UDM to subscribe to the aerial subscription information change event.

Operation 504*a*: Upon trying to provide the NEF with the event for the change in the aerial subscription information (i.e., "Aerial service indication") included in "Session Management Subscription data" in Table 2 above, the UDM receiving the request of operation 503 may request the SMF of operation 501 to subscribe to that end. The UDM may send an Nsmf_EventExposure_Subscribe Request message. The UDM may provide the SMF with an Nsmf_EventExposure_Subscribe Request message including the NEF identifier (endpoint of NEF) and the event that may be detected by the UDM according to the change in the aerial subscription information ("Aerial service indication") in the "Session Management Subscription data" in Table 2 above, the SUPI and/or GPSI.

Operation 504*b*: Upon receiving the request of operation 504*a*, the SMF may transmit a result of the request to the UDM. For example, when the SMF accepts the UDM request, the UDM may provide the UDM with an Nsmf_EventExposure_Subscription Response message including the identifier (Subscription Correlation ID) for the UDM request of operation 504*a* and/or the expiry time according to the policy of the communication carrier.

Operation 505: Upon receiving the result of operation 504*b*, the UDM may transmit the result of the request of the NEF of operation 503 to the NEF. For example, when the SMF accepts the request of the UDM in operation 504*b* and the UDM accepts the request of the NEF, an Nudm_EventExposure_Subscription Response message including the identifier (subscription correlation ID) for the request of the NEF in operation 503 and/or expiry time according to the policy of the communication carrier may be provided to the NEF.

Operation 506: Upon receiving the result of operation 505, the NEF may transmit the result of the request of the USS of operation 502 to the USS. For example, when the UDM accepts the request of the NEF in operation 505 and the NEF accepts the request of the USS, an Nnef_EventExposure_Subscription Response message including the identifier (subscription correlation ID) for the request of the USS in operation 502 and/or expiry time according to the policy of the communication carrier may be provided to the USS.

Operation 507: The UDM, accepting the subscription request of operation 501, may recognize the occurrence of a change in the aerial subscription information ("Aerial service indication") of the "Session Management Subscription data" in Table 2 of the UAV UE. For example, it may correspond to when the value of "Aerial service indication" is changed from 'authorized' to 'not authorized' or from 'allowed' to 'not allowed'. The data key for accessing the "aerial subscription of Session Management Subscription data" information by the UDM may include the SUPI, S-NSSAI, DNN, and serving PLMN ID exemplified in Table 3 above.

Operation 508: The UDM, recognizing a change in the aerial subscription information ("Aerial service indication") of the "Session Management Subscription data" of the UAV UE in operation 507, may notify the SMF, which requested subscription in operation 501, of the same. The UDM may transmit an Nudm_SDM_Notification message. The UDM may provide the SMF with the SUPI and/or GPSI, S-NSSAI, DNN, PLMN ID, and the changed aerial subscription information of the "Session Management Subscription data" in operation 507 above.

Operation 509a: The SMF, receiving the changed aerial subscription information from the UDM in operation 508, may provide the changed aerial subscription information to the NEF having made the subscription request of operation 503, using the NEF indicator provided by the UDM in the subscription request of operation 504a. The SMF may transmit an Namf_EventExposure_Notify message to the NEF. The SMF may provide the NEF with the change in the aerial subscription information based on the changed aerial subscription information received in operation 508, and the SUPI and/or GPSI.

Operation 509b: If the SMF provided the notification of the event occurrence along with the time information (time stamp) in operation 509a, the NEF may request the UDR to store the time information and the event occurrence information. The NEF may transmit an Nudr_DM_Create or Nudr_DM_Update message including the event occurrence information and time information to the UDR.

Operation 510: Upon receiving the notification of the change event occurrence of the aerial subscription information from the SMF in operation 509a, the NEF may notify the USS having requested subscription in operation 502 of the occurrence of the change event. The NEF may transmit an Nnef_EventExposure_Notify message. The NEF may provide the USS with a Nnef_EventExposure_Notify message including the GPSI, the CAA-Level UAV ID, and the change in the aerial subscription information of operation 509a.

Operations 511 to 516b: Operations 511 to 516b are the same as operations 208 to 213b of FIGS. 2A and 2B. In other words, the NEF, receiving the notification of the occurrence of a change in the aerial subscription information, may determine whether the UUAA result for the UAV UE is revoked and, if revoked, notifies the target NF (AMF or SMF) of the revocation of the UUAA result. The target NF (AMF or SMF) may process the subscription request unsubscription for the reachability event of the UAV UE. The AMF may notify the UAV UE of the revocation of the UUAA result and perform a de-registration procedure, and the SMF may perform a procedure for releasing the PDU session(s).

Referring to FIGS. 3A, 4A, and 5A, the operation sequence of operations 301, 401, and 501 is not limited to the examples of FIGS. 3A, 4A, and 5A. For example, the operations of operations 301, 401 and 501, respectively, may be performed after the operations of operations 302, 402, and 502, before the operations of operations 300, 400, and 500, or simultaneously or in parallel to the UUAA procedure.

Further, in the embodiments described above or to be described below, the information indicating the change in the aerial subscription information may be composed of various types of information indicating, e.g., a change from permitted/authorized/authenticated to not permitted/not authorized/not authorized. In this regard, in (changes in) the aerial subscription information transmitted/received by each network entity in the above-described embodiments of the disclosure, the changes remain the same, but information may be composed in various forms depending on the specific field configuration of the message processed by each network entity.

FIGS. 7A to 7D illustrate a procedure in which UUAA revocation is performed by a network in a wireless communication system according to various embodiments of the disclosure.

The embodiment of FIGS. 7A to 7D is based on a combination of the embodiment of FIGS. 4A and 4B and the embodiment of FIGS. 5A and 5B, and adds an operation for updating the UUAA result in the AMF, SMF, and NEF. Further, in the embodiment of FIGS. 7A to 7D, the term "authentication notification" may be understood as equivalent to the term "event exposure" in the above-described embodiments.

Operation 700: Operation 700 is the same as operation 200 of FIG. 2A. When a UUAA procedure (UUAA-MM procedure or UUAA-SM procedure) which is a procedure for authentication and authorization to allow the UAV UE to communicate with the USS through the wireless communication system succeeds, the NEF may store the UUAA context of the UAV UE.

Operation 701a: The AMF may send a subscription request to the UDM to notify of an occurrence of a change in the aerial subscription information about the UAV UE of operation 700. In this case, the AMF may transmit an Nudm_SDM_Subscribe Request message to the UDM. The AMF may provide the UDM with an Nudm_SDM_Subscribe Request message including at least one of the SUPI and/or GPSI, PLMN ID, and the information indicating that the subscription request target is aerial subscription information included in the "Access and Mobility Subscription data" of Table 2 above. For example, the aerial subscription information may correspond to "AerialUESubscriptionInfo" of Table 2 above.

Operation 701b: The SMF may send a subscription request to the UDM to notify of an occurrence of a change in the aerial subscription information about the UAV UE of operation 700. In this case, the SMF may transmit an Nudm_SDM_Subscribe Request message to the UDM. The SMF may provide the UDM with an Nudm_SDM_Subscribe Request message including at least one of the SUPI and/or GPSI, single-network slice selection assistance information (S-NSSAI), data network name (DNN), public land mobile network (PLMN) ID, and information indicating that the subscription request target is the aerial subscription information included in the "Access and Mobility Subscription data" in Table 2 or information indicating that it is the aerial subscription information included in the "UE context in SMF data" or aerial subscription information included in the "Session Management Subscription data" or information indicating that it is aerial subscription information managed by the UDM. The S-NSSAI is an identifier for identifying the network slice, and the DNN may be used to select the SMF and the UPF. For example, the aerial subscription information may correspond to "AerialUESubscriptionInfo" or "Aerial service indication" of Table 2 above. In the present embodiment of the disclosure, as at least one of operations 701a and 701b is performed, at least one of operations 706a and 706b, which is described below, may be performed.

Operation 702: Similar to operation 201 of FIG. 2A, the USS may transmit a subscription request to notify the NEF that a change occurs in the information related to the authentication and/or authorization result of the UAV UE. The USS may transmit an Naf_Authentication_Notification Subscribe message. In the embodiments of the disclosure, messages marked with Naf_Authentication_Notification_xxx may be referred to as Nnef_Authentication_Notification_xxx messages. The USS may provide the NEF with a generic public subscription identifier (GPSI), a CAA-Level UAV ID, and/or a PDU Session IP address. Further, the USS may notify the NEF that the cause of the subscription request corresponds to a change in the aerial subscription information about the UE. The GPSI is an identifier used to process a 5G system subscription in another network outside the 5G system, and may be used inside and outside the 5G system. For a specific definition of the GPSI, refer to TS 23.501 in the 3GPP NR standard. The CAA-Level UAV ID is a unique identifier assigned by the USS or UTM to identify one UAV. For a detailed definition of the CAA-Level UAV ID, refer to TS 23.256 in the 3GPP NR standard.

Operation 703: The NEF, receiving the request of operation 702, may identify the target NF having performed the UUAA procedure in the UUAA context of the UAV UE stored in operation 700. For example, the AMF ID of the AMF when the UUAA-MM procedure is performed and/or the SMF ID of the SMF when the UUAA-SM procedure is performed may be information indicating the target NF. When the NEF is unable to know the AMF ID where the UUAA-MM procedure has been performed, the NEF may provide a GPSI to the UDM and receive the corresponding AMF ID (in this case, an Nudm_UECM_Get Request/Response message may be used). In this embodiment of the disclosure, at least one of operations 704a and 704b, which are described below, may be performed according to the target NF identified in the operation of operation 703, and at least one of operations 707a and 707b, which are described below, may be performed.

Operation 704a: When it is determined that the UUAA-MM procedure has been performed on the UAV UE in operation 703, the NEF may transmit a subscription request to notify the corresponding AMF that a change occurs in the information related to the authentication and/or authorization result of the UAV UE. The NEF may transmit an Nnef_Authentication_Notification Subscribe message. The NEF may provide the AMF with the GPSI and/or SUPI, and an indicator for specifying the result of authentication and/or authorization of the UAV UE. Further, when the NEF receives the cause of the subscription request from the USS in operation 702, the NEF may provide it to the AMF.

Operation 704b: When it is determined that the UUAA-SM procedure has been performed on the UAV UE in operation 703, the NEF may transmit a subscription request to notify the corresponding SMF that a change occurs in the information related to the authentication and/or authorization result of the UAV UE. The NEF may transmit an Nnef_Authentication_Notification Subscribe message. The NEF may provide the SMF with the GPSI and/or SUPI, and an indicator for specifying the result of authentication and/or authorization of the UAV UE, and PDU session IP address. Further, when the NEF receives the cause of the subscription request from the USS in operation 702, the NEF may provide it to the SMF.

Operation 705: The UDM may recognize that a change has occurred in the aerial subscription information about the UAV UE based on the subscription information about the UE managed by the UDM. For example, when a change is made to the aerial subscription information may correspond to when in Table 2, the value of the aerial subscription information (i.e., aerial subscription data) is changed from 'authorized' to 'no authorized' or from 'allowed' to 'not allowed.' An example of the data key for accessing the aerial subscription information about the UAV UE of the UDM may be defined as SUPI as shown in Table 3 above. Table 2 above shows an example of a configuration of the UE's subscription information managed by the UDM, and the UE's subscription information may include aerial subscription information according to an embodiment.

Operation 706a: The UDM, recognizing a change in the aerial subscription information about the UAV UE in operation 705, may notify the AMF, which requested subscription in operation 701a, of the same. The UDM may transmit an Nudm_SDM_Notification message. The UDM may provide the AMF with the SUPI and/or GPSI, PLMN ID, and changed aerial subscription information.

Operation 706b: The UDM, recognizing a change in the aerial subscription information about the UAV UE in operation 705, may notify the SMF, which requested subscription in operation 701b, of the same. The UDM may transmit an Nudm_SDM_Notification message. The UDM may provide the AMF with the SUPI and/or GPSI, S-NSSAI, DNN, PLMN ID, and changed aerial subscription information. The operations of operations 706a and 706b may be selectively performed or both may be performed depending on whether the operations of operations 701a and 701b are performed.

Operation 707a: The AMF, receiving the changed aerial subscription information from the UDM in operation 706a, may determine whether the changed aerial subscription information causes a change in the information related to the authentication and/or authorization result of the UAV UE. For example, when the UE is unable to use the aerial service any longer, the AMF may determine that the authentication and/or authorization result of the UAV UE becomes invalid and determine that a UUAA revocation procedure for the UUAA result should be performed. Further, upon receiving, from the UDM, a change in other subscription information than the aerial subscription information (e.g., information about the network slice allowed for the UE, and information about the DNN allowed for the UE), the AMF may determine whether a change is caused in the information related to the authentication and/or authorization result of the UAV UE based thereupon. Upon determining that a change in the information related to the authentication and/or authorization result of the UAV UE is needed, the AMF may notify the NEF having requested subscription in operation 704a that a change has occurred in the information related to the authentication and/or authorization result of the UAV UE. In this case, the AMF may transmit an Nnef_Authentication_Notification Notify message. The AMF may provide the NEF with an Nnef_Authentication_Notification Notify message including at least one of the GPSI and/or SUPI and an indicator for specifying the authentication and/or authorization result of the UAV UE. Further, when the AMF determines that the authentication and/or authorization result of the UAV UE has become invalid, the AMF may notify the NEF of the same. When the AMF determines that the UUAA revocation procedure should be performed, the AMF may provide the NEF with a cause of revocation of the UUAA result. The cause of revocation may include a change in aerial subscription information and deletion of aerial subscription information. In the embodiments of the disclosure, in at least one of the messages including the "Cause of revocation", "Cause of revocation" may be understood as a cause of invocation related to the cause of revocation.

Operation 707b: The SMF, receiving the changed aerial subscription information from the UDM in operation 706b, may determine whether the changed aerial subscription information causes a change in the information related to the authentication and/or authorization result of the UAV UE. For example, when the UE is unable to use the aerial service any longer, the SMF may determine that the authentication and/or authorization result of the UAV UE becomes invalid and determine that a UUAA revocation procedure for the UUAA result should be performed. Further, upon receiving, from the UDM, a change in other subscription information than the aerial subscription information (e.g., information about the network slice allowed for the UE, and information about the DNN allowed for the UE), the SMF may determine whether a change is caused in the information related to the authentication and/or authorization result of the UAV UE based thereupon. Upon determining that a change in the information related to the authentication and/or authorization result of the UAV UE is needed, the SMF may notify the NEF having requested subscription in operation 704*b* that a change has occurred in the information related to the authentication and/or authorization result of the UAV UE. In this case, the SMF may transmit an Nnef_Authentication_Notification Notify message. The SMF may provide the NEF with an Nnef_Authentication_Notification Notify message including at least one of the GPSI and/or SUPI and an indicator for specifying the authentication and/or authorization result of the UAV UE and the PDU session IP address. Further, when the SMF determines that the authentication and/or authorization result of the UAV UE has become invalid, the AMF may notify the NEF of the same. When the SMF determines that the UUAA revocation procedure should be performed, the AMF may provide the NEF with a cause of revocation of the UUAA result. The cause of revocation may include a change in aerial subscription information and deletion of aerial subscription information.

Operation 708: The NEF, receiving the notification of the occurrence of the change in the information related to the authentication and/or authorization result of the UAV UE in operations 707*a* and 707*b*, may notify the USS having requested subscription in operation 702 that the change has occurred in the information related to the authentication and/or authorization result of the UAV UE. The NEF may determine whether the revocation procedure of the UUAA result should be performed due to the change in the information related to the authentication and/or authorization result of the UAV UE. If the NEF receives the cause of revocation of the UUAA result from the AMF or SMF, the NEF may determine that the revocation procedure of the UUAA result should be performed. In this case, the NEF may transmit an Naf_Authentication_Notification Notify message to the USS. The NEF may provide the USS with an Naf_Authentication_Notification Notify message including at least one of the GPSI, CAA-Level UAV ID, and/or PDU Session IP address. The NEF may inform the USS that the cause of the change in the information related to the authentication and/or authorization result of the UAV UE corresponds to the change in the UE's aerial subscription information. Upon determining that the revocation procedure of the UUAA result should be performed, the NEF may provide the USS with an indicator (or indication) indicating that the revocation procedure of the UUAA result should be performed. The NEF may provide the USS with the cause of revocation of the UUAA result, which may include, e.g., a change in the aerial subscription information and deletion of the aerial subscription information.

Operation 709: The USS, receiving information from the NEF in operation 708, may determine whether the revocation procedure of the UUAA result should be performed due to the change in the information related to the authentication and/or authorization result of the UAV UE. When the NEF provides the USS with the indicator (or indication) indicating that the revocation procedure of the UUAA result should be performed and/or the cause of revocation of the UUAA result in operation 708, the USS may determine that the revocation procedure of the UUAA result should be performed. Upon determining that the cause of revocation of the UUAA result should be performed, the USS may request the NEF to revoke the UUAA result. In this case, the USS may provide the NEF with an Naf_Authentication_Notification Request including at least one of the GPSI, CAA-Level UAV ID, and/or PDU Session IP address. Further, the USS may provide the NEF with the cause of revocation of the UUAA result through the Naf_Authentication_Notification Request. When the NEF provides the USS with the indicator (or indication) indicating that the revocation procedure of the UUAA result should be performed and/or the cause of revocation of the UUAA result in operation 708, the USS may recognize that the revocation procedure of the UUAA result is initiated by the network and omit the operation of operation 709 to request the NEF to revoke the UUAA result.

Operation 710: The NEF may identify the target NF having performed the UUAA procedure in the UUAA context of the UAV UE stored in operation 700. For example, the AMF ID of the AMF when the UUAA-MM procedure is performed and/or the SMF ID of the SMF when the UUAA-SM procedure is performed may be information indicating the target NF. When the NEF is unable to know the AMF ID where the UUAA-MM procedure has been performed, the NEF may provide a GPSI to the UDM and receive the corresponding AMF ID (in this case, an Nudm_UECM_Get Request/Response message may be used).

Operation 711*a*-1: Upon determining that the UUAA-MM procedure is performed on the UAV UE in operation 710, the NEF may notify the corresponding AMF that the authentication and/or authorization result of the UAV UE is revoked. In this case, the NEF may transmit an Nnef_Auth_Notification Request message to the AMF. The NEF may provide the AMF with an Nnef_Auth_Notification Request message including at least one of the GPSI and/or SUPI and an indicator for specifying the authentication and/or authorization result of the UAV UE. Further, the NEF may provide the cause of revocation of the authentication and/or authorization result of the UAV UE. The cause of revocation of the authentication and/or authorization result of the UAV UE may include, e.g., the UAV is not authorized anymore, aerial subscription information is not allowed, or aerial subscription removal.

Operation 711*a*-2: The AMF, receiving the request of operation 711*a*-1, may update the information related to the authentication and/or authorization result stored for the corresponding UAV UE. Updating the information related to the authentication and/or authorization result may include changing the UUAA-MM status value for the corresponding UAV UE to 'PENDING' or 'FAILED'. Further, the update may include deleting the UUAA-MM status field.

Operation 711*a*-3: The AMF may respond to the NEF with recognition of revocation of the authentication and/or authorization result of the UAV UE. In this case, the AMF may transmit an Nnef_Auth_Notification Response message to the NEF.

Operation 711*b*-1: Upon determining that the UUAA-SM procedure is performed on the UAV UE in operation 710, the NEF may notify the corresponding SMF that the authentication and/or authorization result of the UAV UE is revoked.

In this case, the NEF may transmit an Nnef_Auth_Notification Request message to the SMF. The NEF may provide the SMF with an Nnef_Auth_Notification Request message including at least one of the GPSI and/or SUPI and an indicator for specifying the authentication and/or authorization result of the UAV UE and the PDU session IP address. Further, the NEF may provide the cause of revocation of the authentication and/or authorization result of the UAV UE. The cause of revocation of the authentication and/or authorization result of the UAV UE may include, e.g., the UAV is not authorized anymore, aerial subscription information is not allowed, or aerial subscription removal.

Operation 711b-2: The SMF, receiving the request of operation 711b-1, may update the information related to the authentication and/or authorization result stored for the corresponding UAV UE. Updating the information related to the authentication and/or authorization result may include changing the UUAA-SM status value for the corresponding UAV UE to 'PENDING' or 'FAILED'. Further, the update may include deleting the UUAA-SM status field. Further, the update may include deleting a successful UUAA result.

Operation 711b-3: The SMF may respond to the NEF with recognition of revocation of the authentication and/or authorization result of the UAV UE. In this case, the SMF may transmit an Nnef_Auth_Notification Response message to the NEF.

Operation 712: The NEF, receiving the response from the AMF or SMF in operation 711a-3 or 711b-3, may modify the stored UUAA context of the UAV UE. The modification of the UUAA context may include deletion of the UUAA context.

Operation 713: The NEF may inform the US S that the revocation of the authentication and/or authorization result of the UAV UE of the UAV UE in the network has been completed. The NEF may respond to the USS request in operation 709. In this case, the NEF may transmit an Naf_Authentication_Notification Response message to the USS.

Operation 714a: When the NEF requested the AMF to subscribe to the reachability event of the UAV UE in the UUAA procedure before operation 700, the NEF may request to unsubscribe the corresponding subscription request. The NEF may have requested the AMF to subscribe to the mobility event exposure in which the value of the event ID is indicated as reachability filter. The NEF and the AMF may have used the Namf_EventExposure_Subscribe Request and response message, and the NEF may provide the subscription correlation ID allocated at that time to the AMF to request to unsubscribe the subscription request for the reachability event. Upon requesting to unsubscribe, the NEF may use the Namf_EventExposure_Unsubscribe Request message. The UE reachability event may be defined as UE Reachability in Table 1 above.

Operation 710b: The AMF, receiving a request for unsubscribing the subscription request for the reachability event of the UAV UE in operation 710a, may transmit an acknowledgment for reception of the request to the NEF. Upon responding with the acknowledgment, the AMF may use the Namf_EventExposure_Unsubscribe Response message.

Operation 715: When the UAV UE is in the idle state, a network trigger service request procedure as specified in 3GPP standard TS 23.502 may be performed.

Operation 716a: Upon determining that the UUAA-MM procedure was performed in operation 710, the AMF may notify the UE that the UUAA result is revoked based on the network policy. The AMF may perform a UE configuration update (UCU) procedure as specified in 3GPP standard TS 23.502, to notify the UE of the revocation of the UUAA result. Further, the AMF may initiate a procedure for releasing the PDU session(s) for the relevant UAS service(s). If the UE receives information representing the revocation of the UUAA result and/or the cause of the revocation from the network, upon determining whether to perform a procedure for de-registration, a PDU session release or a resource release for at least one of a network registration state for the UE to use an UAS service and a PDU session having established with the network for the UE to use the UAS service, the UE may refer to the information representing the revocation of the UUAA result and/or the cause of the revocation.

Operation 716b: Upon determining that the UUAA-MM procedure was performed in operation 710, the AMF may initiate a de-registration procedure, as specified in 3GPP standard TS 23.502, based on the network policy.

Operation 716c: Upon determining that the UUAA-SM procedure was performed in operation 710, the SMF may initiate a network initiated PDU session release procedure, as specified in 3GPP standard TS 23.502, as a procedure for releasing the related PDU session(s).

Operation 716a: When the NEF requested the SMF to subscribe to a certain event in the UUAA procedure before operation 700, the NEF may request to unsubscribe the corresponding subscription request. The NEF may have requested the SMF to subscribe to the PDU session status event of Table 1 above. The NEF and the SMF may have used the Nsmf_EventExposure_Subscribe Request and response message upon requesting to subscribe to the PDU session status event and responding, and the NEF may provide the subscription correlation ID allocated at that time to the SMF to request to unsubscribe the subscription request for the PDU session status event. Upon unsubscription request, the NEF may use the Nsmf_EventExposure_Unsubscribe Request message.

Operation 716b: The SMF, receiving a request for unsubscribing the subscription request for the event in operation 716a, may transmit an acknowledgment for reception of the request to the NEF. Upon responding with the acknowledgment, the SMF may use the Nsmf_EventExposure_Unsubscribe Response message.

Figure 8A:
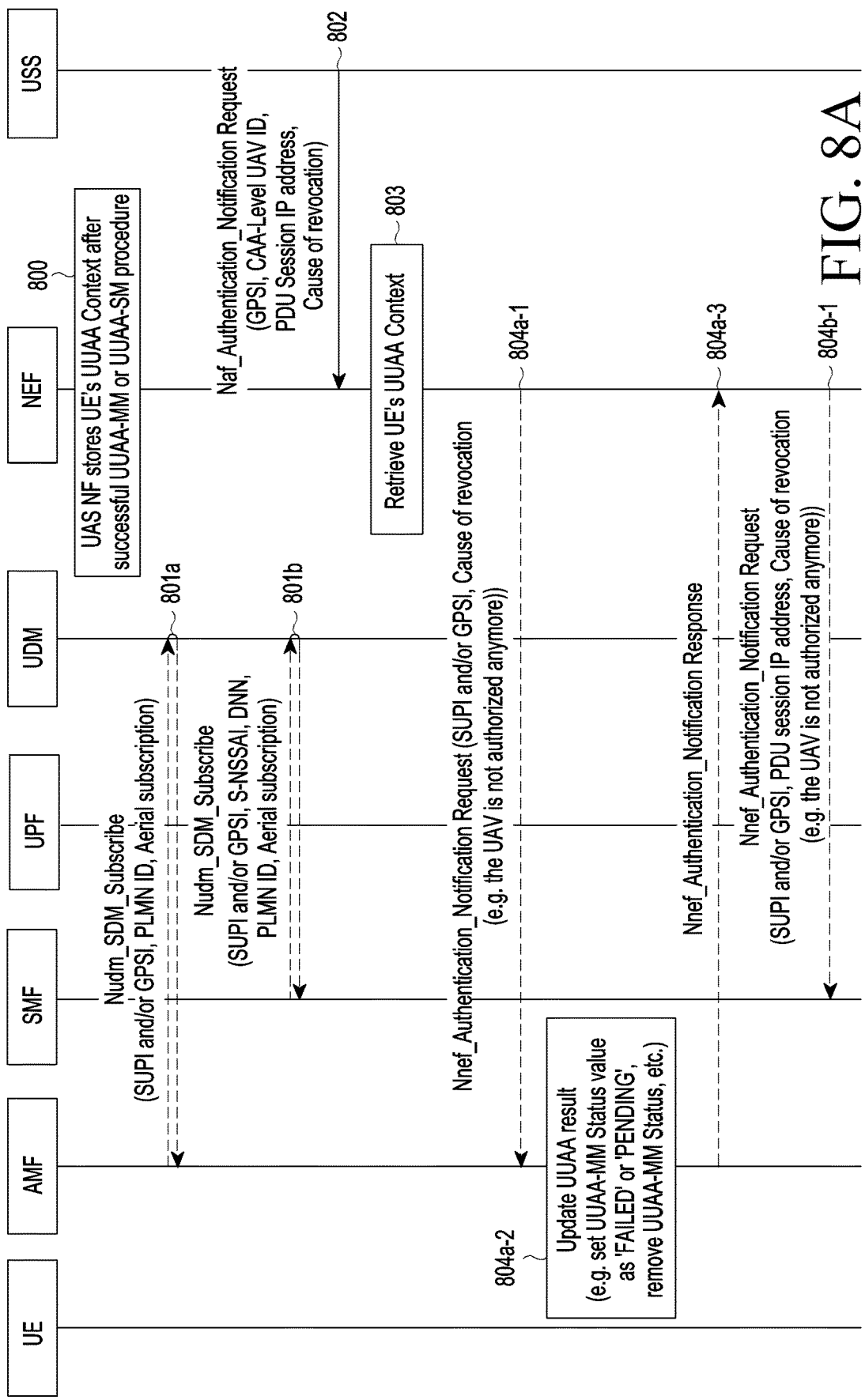
FIGS. 8A and 8B are views illustrating a procedure in which UUAA revocation is performed by a USS in a wireless communication system according to various embodiments of the disclosure.
Figure 8B:
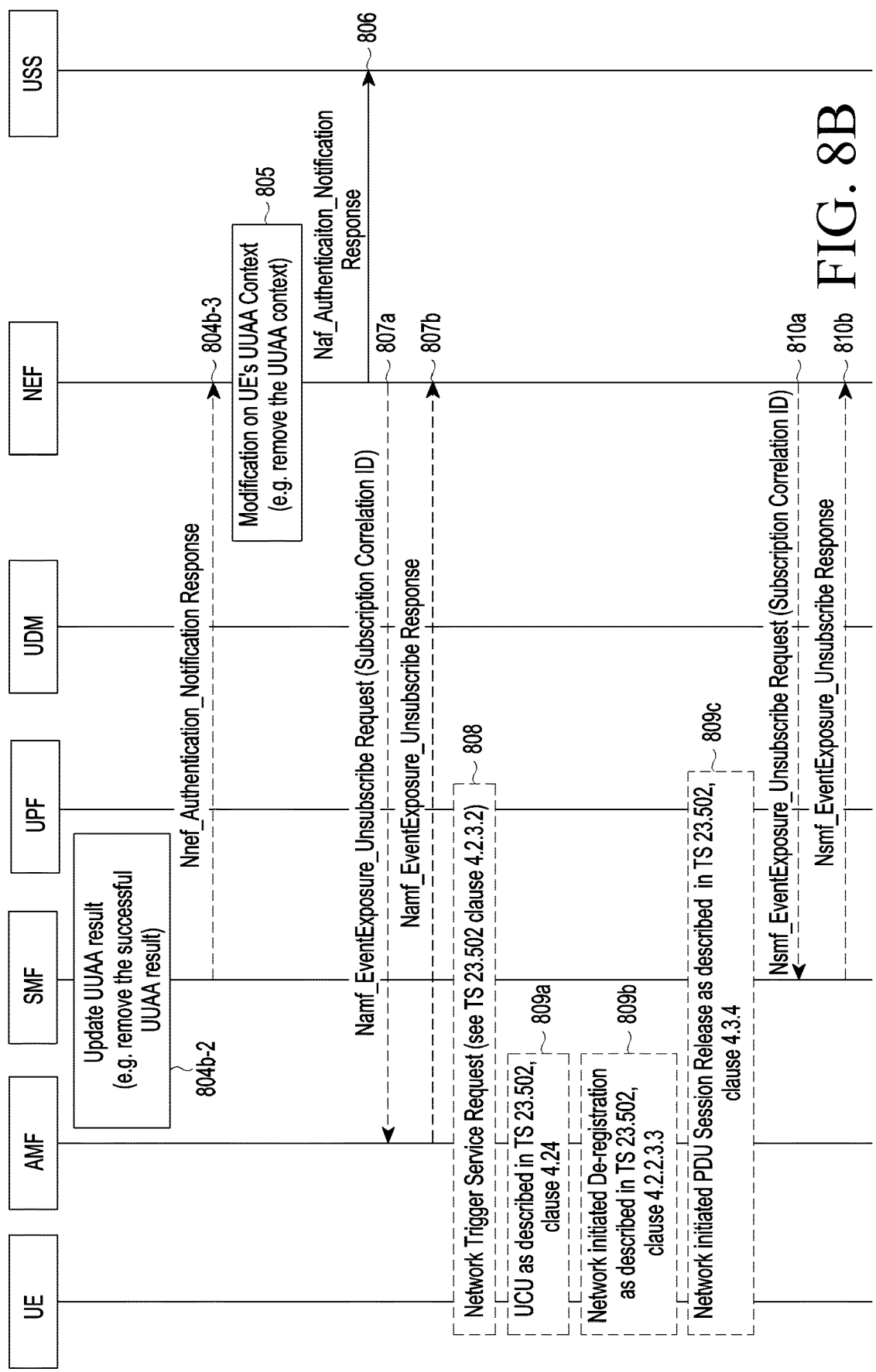

FIGS. 8A and 8B illustrate a procedure in which UUAA revocation is performed by a USS in a wireless communication system according to various embodiments of the disclosure.

Referring to FIGS. 8A and 8B, the operations of operations 702 to 708 are not performed in the embodiment of FIGS. 7A to 7D. Further, in the embodiment of FIGS. 8A and 8B, the term "authentication notification" may be understood as equivalent to the term "event exposure" in the above-described embodiments.

Operation 800: Operation 800 is the same as operation 200 of FIG. 2A. When a UUAA procedure (UUAA-MM procedure or UUAA-SM procedure) which is a procedure for authentication and authorization to allow the UAV UE to communicate with the USS through the wireless communication system succeeds, the NEF may store the UUAA context of the UAV UE.

Operation 801a: The AMF may send a subscription request to the UDM to notify of an occurrence of a change in the aerial subscription information about the UAV UE of operation 800. The AMF may send an Nudm_SDM_Subscribe Request message to the UDM. The AMF may provide the UDM with an Nudm_SDM_Subscribe Request message including at least one of the SUPI and/or GPSI, PLMN ID, and the information indicating that the subscription request target is aerial subscription information included in the "Access and Mobility Subscription data" of Table 2 above. For example, the aerial subscription information may correspond to "AerialUESubscriptionInfo" of Table 2 above.

Operation 801b: The SMF may send a subscription request to the UDM to notify of an occurrence of a change in the aerial subscription information about the UAV UE of operation 800. In this case, the SMF may transmit an Nudm_SDM_Subscribe Request message to the UDM. The SMF may provide the UDM with an Nudm_SDM_Subscribe Request message including at least one of the SUPI and/or GPSI, single-network slice selection assistance information (S-NSSAI), data network name (DNN), public land mobile network (PLMN) ID, and information indicating that the subscription request target is the aerial subscription information included in the "Access and Mobility Subscription data" in Table 2 or information indicating that it is the aerial subscription information included in the "UE context in SMF data" or aerial subscription information included in the "Session Management Subscription data" or information indicating that it is aerial subscription information managed by the UDM. The S-NSSAI is an identifier for identifying the network slice, and the DNN may be used to select the SMF and the UPF. For example, the aerial subscription information may correspond to "AerialUESubscriptionInfo" or "Aerial service indication" of Table 2 above.

Operation 802: The USS may determine whether the revocation procedure of the UUAA result should be performed due to the change in the information related to the authentication and/or authorization result of the UAV UE. Upon determining that the cause of revocation of the UUAA result should be performed, the USS may request the NEF to revoke the UUAA result. The USS may transmit, to the NEF, an Naf_Authentication_Notification Request including at least one of the GPSI, CAA-Level UAV ID, and/or PDU Session IP address. Further, the USS may provide the NEF with the cause of revocation of the UUAA result through the Naf_Authentication_Notification Request.

Operation 803: The NEF may identify the target NF having performed the UUAA procedure in the UUAA context of the UAV UE stored in operation 800. For example, the AMF ID of the AMF when the UUAA-MM procedure is performed and/or the SMF ID of the SMF when the UUAA-SM procedure is performed may be information indicating the target NF. When the NEF is unable to know the AMF ID where the UUAA-MM procedure has been performed, the NEF may provide a GPSI to the UDM and receive the corresponding AMF ID (in this case, an Nudm_UECM_Get Request/Response message may be used). In this embodiment of the disclosure, operations associated with at least one of the AMF and the SMF may be all or selectively performed according to the target NF identified in the operation of operation 803.

Operation 804a-1: Upon determining that the UUAA-MM procedure is performed on the UAV UE in operation 803, the NEF may notify the corresponding AMF that the authentication and/or authorization result of the UAV UE is revoked. In this case, the NEF may transmit an Nnef_Auth_Notification Request message to the AMF. The NEF may provide the AMF with an Nnef_Auth_Notification Request message including at least one of the GPSI and/or SUPI and an indicator for specifying the authentication and/or authorization result of the UAV UE. Further, the NEF may provide the cause of revocation of the authentication and/or authorization result of the UAV UE through the Nnef_Auth_Notification Request message. The cause of revocation of the authentication and/or authorization result of the UAV UE may include, e.g., the UAV is not authorized anymore, aerial subscription information is not allowed, or aerial subscription removal.

Operation 804a-2: The AMF, receiving the request of operation 804a-1, may update the information related to the authentication and/or authorization result stored for the corresponding UAV UE. Updating the information related to the authentication and/or authorization result may include changing the UUAA-MM status value for the corresponding UAV UE to 'PENDING' or 'FAILED'. Further, the update may include deleting the UUAA-MM status field.

Operation 804a-3: The AMF may respond to the NEF with recognition of revocation of the authentication and/or authorization result of the UAV UE. In this case, the AMF may transmit an Nnef_Auth_Notification Response message to the NEF.

Operation 804b-1: Upon determining that the UUAA-SM procedure is performed on the UAV UE in operation 803, the NEF may notify the corresponding SMF that the authentication and/or authorization result of the UAV UE is revoked. In this case, the NEF may transmit an Nnef_Auth_Notification Request message to the SMF. The NEF may provide the SMF with an Nnef_Auth_Notification Request message including at least one of the GPSI and/or SUPI and an indicator for specifying the authentication and/or authorization result of the UAV UE and the PDU session IP address. Further, the NEF may provide the cause of revocation of the authentication and/or authorization result of the UAV UE. The cause of revocation of the authentication and/or authorization result of the UAV UE may include, e.g., the UAV is not authorized anymore, aerial subscription information is not allowed, or aerial subscription removal.

Operation 804b-2: The SMF, receiving the request of operation 804b-1, may update the information related to the authentication and/or authorization result stored for the corresponding UAV UE. Updating the information related to the authentication and/or authorization result may include changing the UUAA-SM status value for the corresponding UAV UE to 'PENDING' or 'FAILED'. Further, the update may include deleting the UUAA-SM status field. Further, the update may include deleting a successful UUAA result.

Operation 804b-3: The SMF may respond to the NEF with recognition of revocation of the authentication and/or authorization result of the UAV UE. In this case, the SMF may transmit an Nnef_Auth_Notification Response message to the NEF.

Operation 805: The NEF, receiving the response from the AMF or SMF in operation 804a-3 or 804b-3, may modify the stored UUAA context of the UAV UE. The modification of the UUAA context may include deletion of the UUAA context.

Operation 806: The NEF may inform the USS that the revocation of the authentication and/or authorization result of the UAV UE of the UAV UE in the network has been completed. The NEF may respond to the USS request in operation 802. In this case, the NEF may transmit an Naf_Authentication_Notification Response message to the USS.

Operation 807a: When the NEF requested the AMF to subscribe to the reachability event of the UAV UE in the UUAA procedure before operation 800, the NEF may request to unsubscribe the corresponding subscription request. The NEF may have requested the AMF to subscribe to the mobility event exposure in which the value of the event ID is indicated as reachability filter. The NEF and the AMF may have used the Namf_EventExposure_Subscribe Request and response message, and the NEF may provide the subscription correlation ID allocated at that time to the AMF to request to unsubscribe the subscription request for the reachability event. Upon requesting to unsubscribe, the NEF may use the Namf_EventExposure_Unsubscribe Request message. The UE reachability event may be defined as UE Reachability in Table 1 above.

Operation 807b: The AMF, receiving a request for unsubscribing the subscription request for the reachability event of the UAV UE in operation 807a, may transmit an acknowledgment for reception of the request to the NEF. Upon responding with the acknowledgment, the AMF may use the Namf_EventExposure_Unsubscribe Response message.

Operation 808: When the UAV UE is in the idle state, a network trigger service request procedure as specified in 3GPP standard TS 23.502 may be performed.

Operation 809a: Upon determining that the UUAA-MM procedure was performed in operation 803, the AMF may notify the UE that the UUAA result is revoked based on the network policy. The AMF may perform a UE configuration update (UCU) procedure as specified in 3GPP standard TS 23.502, to notify the UE of the revocation of the UUAA result. Further, the AMF may initiate a procedure for releasing the PDU session(s) for the relevant UAS service(s).

Operation 809b: Upon determining that the UUAA-MM procedure was performed in operation 803, the AMF may initiate a de-registration procedure, as specified in 3GPP standard TS 23.502, based on the network policy.

Operation 809c: Upon determining that the UUAA-SM procedure was performed in operation 803, the SMF may initiate a network initiated PDU session release procedure, as specified in 3GPP standard TS 23.502, as a procedure for releasing the related PDU session(s).

Operation 810a: When the NEF requested the SMF to subscribe to a certain event in the UUAA procedure before operation 800, the NEF may request to unsubscribe the corresponding subscription request. The NEF may have requested the SMF to subscribe to the PDU session status event of Table 1 above. The NEF and the SMF may have used the Nsmf_EventExposure_Subscribe Request and response message upon requesting to subscribe to the PDU session status event and responding, and the NEF may provide the subscription correlation ID allocated at that time to the SMF to request to unsubscribe the subscription request for the PDU session status event. Upon unsubscription request, the NEF may use the Nsmf_EventExposure_Unsubscribe Request message.

Operation 810b: The SMF, receiving a request for unsubscribing the subscription request for the event in operation 810a, may transmit an acknowledgment for reception of the request to the NEF. Upon responding with the acknowledgment, the SMF may use the Nsmf_EventExposure_Unsubscribe Response message.

Figure 7A:
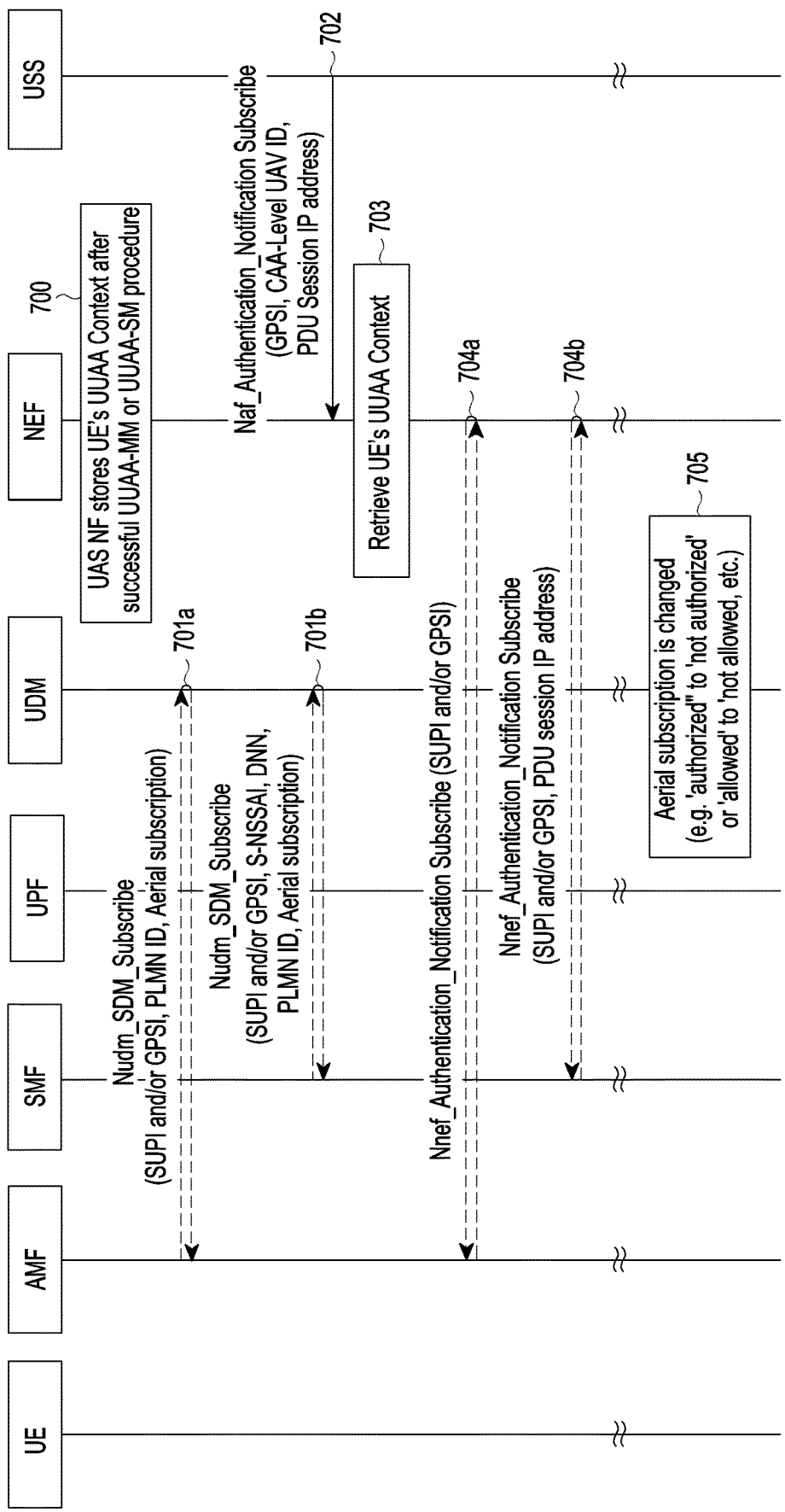
FIGS. 7A, 7B, 7C, and 7D are views illustrating a procedure in which UUAA revocation is performed by a network in a wireless communication system according to various embodiments of the disclosure.
Figure 7B:
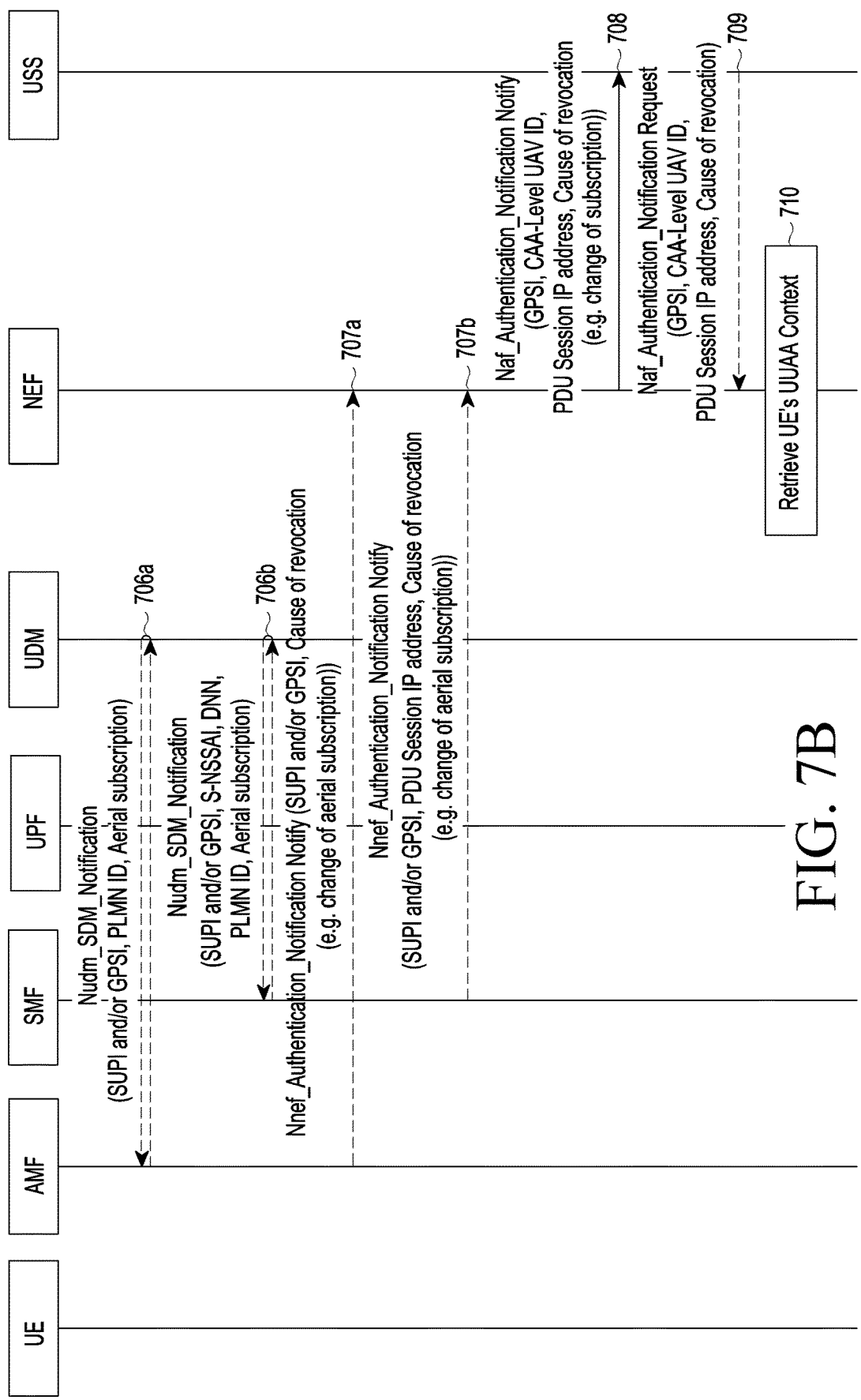
Figure 7C:
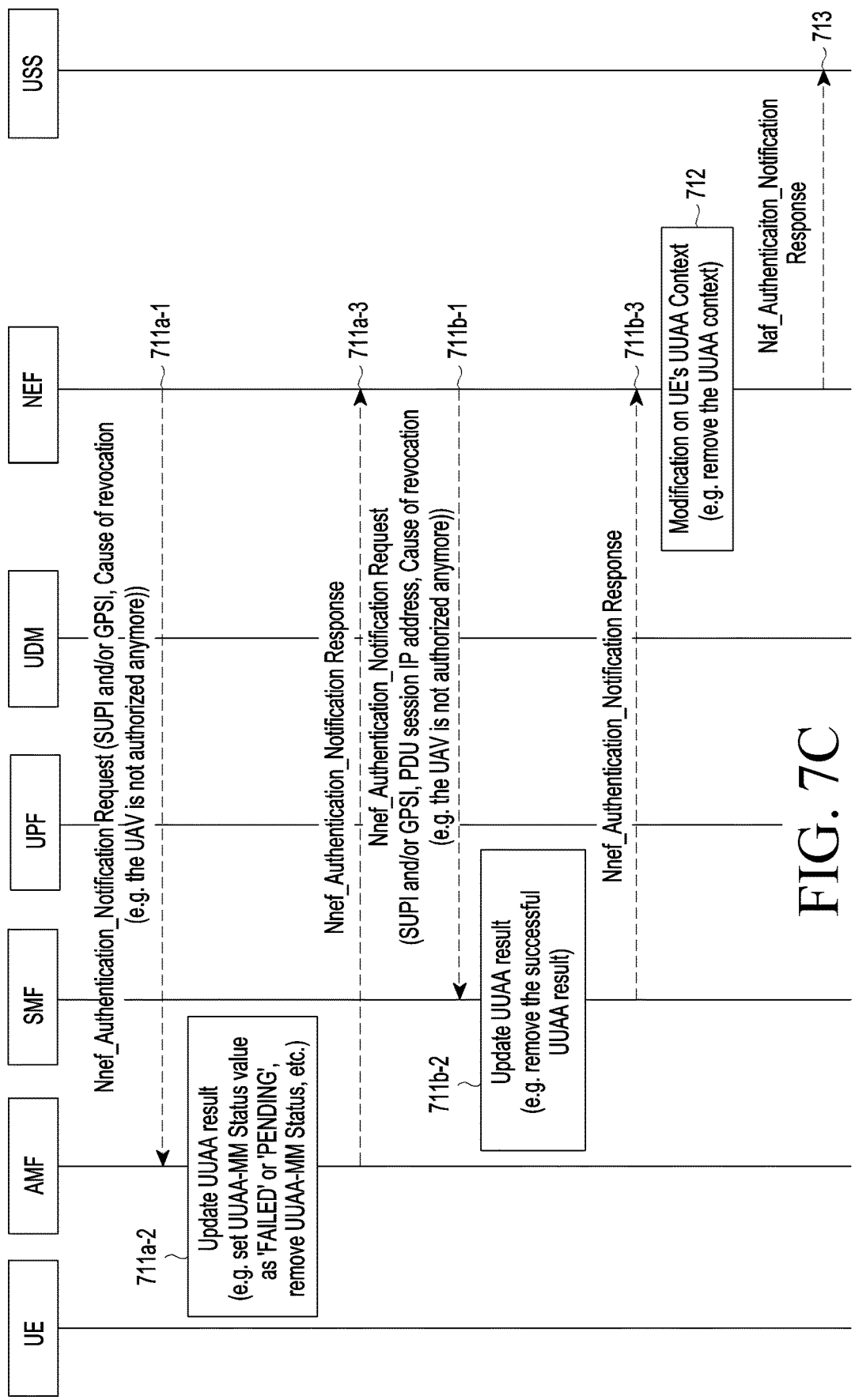
Figure 7D:
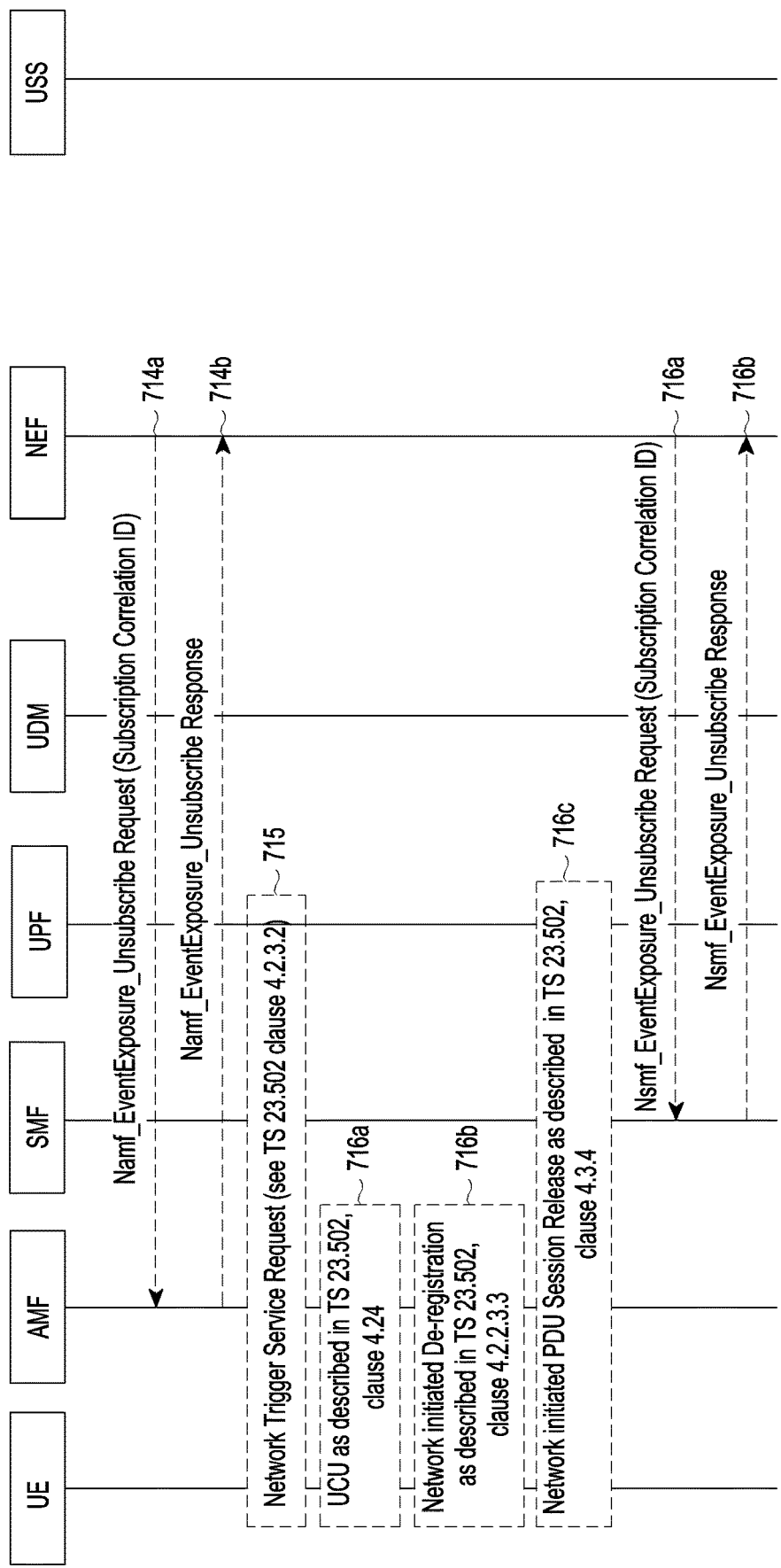

Meanwhile, in the embodiment of FIGS. 7A and 8A, the operation sequence of operations 701a and 701b and operations 801a and 801b is not limited to the example of FIGS. 7A and 8A. For example, the operations of operations 701a and 701b and operations 801a and 801b, respectively, may be performed after the operations of operations 702 and 802, before the operations of operations 700 and 800, or simultaneously or in parallel to the UUAA procedure.

Figure 6:
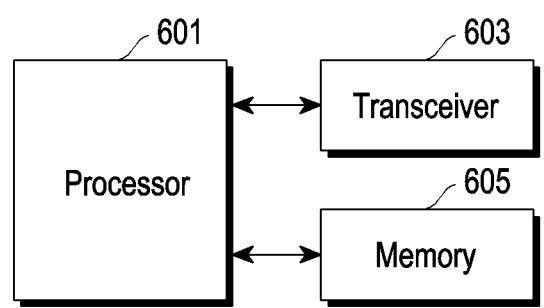
FIG. 6 is a view illustrating a configuration of a network entity according to an embodiment of the disclosure.

FIG. 6 is a view illustrating a configuration of a network entity according to an embodiment of the disclosure.

Referring to FIG. 6, it may be one of the network functions (NFs), such as the UDM, NEF, USS, SMF, and AMF, described above in connection with the embodiments of FIGS. 1A, 1B, 2A, 2B, 3A, 3B, 4A, 4B, 5A, 5B, 6, 7A to 7D, 8A and 8B.

According to an embodiment of the disclosure, the network entity may include a processor 601 controlling the overall operation of the network entity, a transceiver 603 including a transmitter and a receiver, and a memory 605. Without limited thereto, the network entity may include more or less components than those shown in FIG. 6.

According to an embodiment of the disclosure, the transceiver 603 may transmit/receive signals to/from at least one of other network entities or a terminal including a UAV/UAVC. The signals transmitted/received with at least one of the other network entities or the terminal may include control information and data.

According to an embodiment of the disclosure, the processor 601 may control the overall operation of the network entity to perform operations according to a combination of one or more of the embodiments of FIGS. 1A, 1B, 2A, 2B, 3A, 3B, 4A, 4B, 5A, 5B, 6, 7A to 7D, 8A and 8B described above. The processor 601, the memory 605, and the transceiver 603 are not necessarily implemented in separate modules but rather as a single component, e.g., a single chip. The processor 601 and the transceiver 603 may be electrically connected with each other. The processor 601 may be an application processor (AP), a communication processor (CP), a circuit, an application-specific circuit, or at least one processor. The transceiver 603 may include a communication interface for wiredly/wirelessly transmitting/receiving signals to/from another network entity.

According to an embodiment of the disclosure, the memory 605 may store a default program for operating the network entity, application programs, and data, such as configuration information. The memory 605 provides the stored data according to a request of the processor 1201. The memory 605 may include a storage medium, such as read only memory (ROM), random access memory (RAM), hard disk, compact disc read only memory (CD-ROM), and digital versatile disc (DVD), or a combination of storage media. There may be provided a plurality of memories 605. The processor 601 may perform at least one of the above-described embodiments based on a program for performing operations according to at least one of the above-described embodiments stored in the memory 605.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

It should be noted that the above-described configuration views, example views of control/data signal transmission methods, example views of operational procedures, and configuration views are not intended as limiting the scope of the disclosure. In other words, all the components, network entities, or operations described in connection with the embodiments should not be construed as essential components to practice the disclosure, and the disclosure may be rather implemented with only some of the components without departing from the gist of the disclosure. Further, the embodiments may be practiced in combination. For example, some of the methods proposed herein may be combined to operate the network entity and the terminal.

In the above-described specific embodiments of the disclosure, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an unmanned aerial system network function (UAS NF) in a wireless communication system providing a UAS service for an unmanned aerial vehicle user equipment (UAV UE), the method comprising:
receiving, from a UAS service supplier (USS), a first message including notification for USS UAV authentication and authorization (UUAA) revocation associated with the UAV UE;
identifying UUAA information for the UAV UE;
determining, based on the UUAA information, a network entity to which the notification for the UUAA revocation associated with the UAV UE is to be transmitted;
transmitting, to the network entity, a second message including the notification for the UUAA revocation associated with the UAV UE;
receiving, from the network entity, a third message in response to the second message wherein the third message is related to removal of a successful UUAA result in the network entity; and
removing the UUAA information for the UAV UE in response to the third message.

2. The method of claim 1, wherein the notification for the UUAA revocation includes cause information of the UUAA revocation for the UAV UE.

3. The method of claim 1, further comprising storing the UUAA information for the UAV UE after a successful UUAA procedure for the UAV UE, the UUAA information including a UUAA context for the UAV UE.

4. The method of claim 1, wherein the first message further includes at least one of generic public subscription identifier (GPSI), civil aviation administration (CAA)-Level UAV ID, or a protocol data unit (PDU) session internet protocol (IP) address for the UAV UE.

5. The method of claim 1, further comprising:
transmitting, to the USS, a response message indicating an authorization revocation for the UAV UE.

6. The method of claim 1, wherein the network entity is either an access and mobility management function (AMF) performing a UUAA-mobility management (MM) procedure for the UAV UE or a session management function (SMF) performing a UUAA-session management (SM) procedure.

7. The method of claim 6, further comprising:
receiving, from the AMF or the SMF, a fourth message including information indicating a change of aerial subscription information for the UAV UE; and
transmitting, to the USS, a fifth message including information notifying the change to the USS in case that the aerial subscription information is changed from 'authorized' to 'no authorized'.

8. An unmanned aerial system network function (UAS NF) in a wireless communication system providing a UAS service for an unmanned aerial vehicle user equipment (UAV UE), the UAS NF comprising:
a transceiver; and
at least one processor coupled to the transceiver and configured to:
receive, from a UAS service supplier (USS), a first message including notification for USS UAV authentication and authorization (UUAA) revocation associated with the UAV UE,
identify UUAA information for the UAV UE,
determine, based on the UUAA information, a network entity to which the notification for the UUAA revocation associated with the UAV UE is to be transmitted,
transmit, to the network entity, a second message including the notification for the UUAA revocation associated with the UAV UE,
receive, from the network entity, a third message in response to the second message wherein the third message is related to removal of a successful UUAA result in the network entity, and
remove, the UUAA information for the UAV UE.

9. The UAS NF of claim 8, wherein the notification for the UUAA revocation includes cause information of the UUAA revocation for the UAV UE.

10. The UAS NF of claim 8, wherein the at least one processor is further configured to store the UUAA information for the UAV UE after a successful UUAA procedure for the UAV UE, the UUAA information including a UUAA context for the UAV UE.

11. The UAS NF of claim 8, wherein the first message further includes at least one of generic public subscription identifier (GPSI), civil aviation administration (CAA)-Level UAV ID, or a protocol data unit (PDU) session internet protocol (IP) address for the UAV UE.

12. The UAS NF of claim 8, wherein the at least one processor is further configured to transmit, to the USS, a response message indicating an authorization revocation for the UAV UE.

13. The UAS NF of claim 8, wherein the network entity is either an access and mobility management function (AMF) performing a UUAA-mobility management (MM) procedure for the UAV UE or a session management function (SMF) performing a UUAA-session management (SM) procedure.

14. The UAS NF of claim 13, wherein the at least one processor is further configured to:
receive, from the AMF or the SMF, a third message including information indicating a change of aerial subscription information for the UAV UE, and
transmit, to the USS, a fourth message including information notifying the change to the USS in case that the aerial subscription information is changed from 'authorized' to 'no authorized'.

15. An access and mobility management function (AMF) in a wireless communication system providing an unmanned aerial system (UAS) service for an unmanned aerial vehicle user equipment (UAV UE), the AMF comprising:
a transceiver; and
at least one processor configured to:
perform a UAS service supplier UAV (USS UAV) authentication and authorization-mobility management (UUAA-MM) procedure for the UAV UE, receive, from a unified data management (UDM) managing aerial subscription information, a first message for indicating a change of the aerial subscription information for the UAV UE, and transmit, to a UAS network function (UAS NF), a fourth message for indicating the change of the aerial subscription information for the UAV UE.

16. The AMF of claim 15, wherein the change of the aerial subscription information includes that the aerial subscription information for the UAV UE is changed from 'authorized' to 'no authorized'.

17. The AMF of claim 15, wherein the at least one processor is further configured to receive, from the UAS NF, a second message including notification for a UUAA revocation associated with the UAV UE, wherein the notification for the UUAA revocation includes cause information of the UUAA revocation for the UAV UE.

18. A session management function (SMF) in a wireless communication system providing an unmanned aerial system (UAS) service for an unmanned aerial vehicle user equipment (UAV UE), the SMF comprising:

a transceiver; and
at least one processor configured to:
perform a UAS service supplier UAV (USS UAV) authentication and authorization-session management (SM) procedure for the UAV UE,
receive, from a unified data management (UDM) managing aerial subscription information, a first message for indicating a change of the aerial subscription information for the UAV UE, and
transmit, to a UAS network function (UAS NF), a fourth message for indicating the change of the aerial subscription information for the UAV UE.

19. The SMF of claim 18, wherein the change of the aerial subscription information includes that the aerial subscription information for the UAV UE is changed from 'authorized' to 'no authorized'.

20. The SMF of claim 18, wherein the at least one processor is further configured to receive, from the UAS NF, a second message including notification for a UUAA revocation associated with the UAV UE, wherein the notification for the UUAA revocation includes cause information of the UUAA revocation for the UAV UE.

* * * * *